(12) United States Patent
Okada

(10) Patent No.: US 8,588,573 B2
(45) Date of Patent: *Nov. 19, 2013

(54) METHOD FOR MANUFACTURING OPTICAL FIBER AND OPTICAL FIBER

(75) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 13/183,561

(22) Filed: Jul. 15, 2011

(65) Prior Publication Data

US 2011/0274404 A1 Nov. 10, 2011

Related U.S. Application Data

(63) Continuation of application No. PCT/JP2010/002761, filed on Apr. 16, 2010.

(30) Foreign Application Priority Data

Apr. 16, 2009 (JP) .................................. 2009-100044

(51) Int. Cl.
*G02B 6/00* (2006.01)
*C03C 25/10* (2006.01)
*C03B 37/026* (2006.01)

(52) U.S. Cl.
USPC ........................................... 385/141; 65/432

(58) Field of Classification Search
USPC ............ 385/129–135, 141, 147; 65/381, 432, 65/424
See application file for complete search history.

(56) References Cited

U.S. PATENT DOCUMENTS

| 4,792,347 A | 12/1988 | Deneka et al. |
| 5,974,837 A | 11/1999 | Abbott, III et al. |
| 6,131,415 A | 10/2000 | Chang et al. |
| 8,015,847 B2 * | 9/2011 | Okada et al. ................. 65/424 |
| 2003/0148025 A1 | 8/2003 | Azegami et al. |
| 2005/0252246 A1 | 11/2005 | Shirley et al. |
| 2008/0016917 A1 | 1/2008 | Miyamoto et al. |

FOREIGN PATENT DOCUMENTS

| CN | 1157807 A | 8/1997 |
| CN | 1405105 A | 3/2003 |
| CN | 1882513 A | 12/2006 |
| DE | 3925946 A | 2/1991 |
| JP | 63-100036 A | 5/1988 |

(Continued)

OTHER PUBLICATIONS

International Search Report issued in International Application No. PCT/JP2009/007073 dated Apr. 6, 2010.

(Continued)

*Primary Examiner* — Akm Enayet Ullah
(74) *Attorney, Agent, or Firm* — Sughrue Mion, PLLC

(57) ABSTRACT

A method for manufacturing an optical fiber in which a flow of a cooling gas within a cooling device is made to be an upward flow and the cooling gas is discharged to outside from an upper end of the cooling device by connecting the cooling device and a coating device in an airtight manner, and closing a flow of the cooling gas which flows toward a coating device within the cooling device using a meniscus of resin within the coating device. A temperature of the cooling gas is increased toward an upper portion of the cooling device from a lower portion of the cooling device by adjusting the flow rate of the cooling gas.

13 Claims, 10 Drawing Sheets

(56) References Cited

FOREIGN PATENT DOCUMENTS

| | | | |
|---|---|---|---|
| JP | 1-183434 | A | 7/1989 |
| JP | 01286941 | A | 11/1989 |
| JP | 03-153541 | A | 7/1991 |
| JP | 7-109150 | A | 4/1995 |
| JP | 8-259273 | A | 10/1996 |
| JP | 09-048643 | A | 2/1997 |
| JP | 2844741 | B2 | 1/1999 |
| JP | 2000-103649 | A | 4/2000 |
| JP | 3098232 | B1 | 10/2000 |
| JP | 2001-013380 | A | 1/2001 |
| JP | 2003-095689 | A | 4/2003 |
| JP | 2003-146688 | A | 5/2003 |
| JP | 2003-226559 | A | 8/2003 |
| JP | 2003-342043 | A | 12/2003 |
| JP | 2004-067466 | A | 3/2004 |
| JP | 2004-142976 | A | 5/2004 |
| JP | 2004-339026 | A | 12/2004 |
| JP | 2004-359513 | A | 12/2004 |
| JP | 2005-075664 | A | 3/2005 |
| JP | 2005-119901 | A | 5/2005 |
| JP | 2007-197273 | A | 8/2007 |
| JP | 4214389 | B2 | 11/2008 |
| JP | 4214389 | B2 | 1/2009 |
| RU | 2169710 | C2 | 6/2001 |
| RU | 2174248 | C2 | 9/2001 |
| RU | 2177916 | C2 | 1/2002 |
| RU | 2329123 | C2 | 7/2008 |
| SU | 971087 | A3 | 10/1982 |
| SU | 1033457 | A | 8/1983 |
| SU | 1723059 | A | 3/1992 |

OTHER PUBLICATIONS

Notice of Allowance issued by Russian Patent Office in Russian Application No. 2009119291 dated Jul. 26, 2010.
Office Action issued by Korean Patent Office in Korean Application No. 10-2009-0035184 dated Jan. 27, 2011.
Notice of Allowance issued by Korean Patent Office in Korean Application No. 10-2009-0035184 dated Sep. 21, 2011.
Office Action issued by U.S. Patent Office in U.S. Appl. No. 13/161,132 dated Feb. 15, 2012.
Final Office Action issued by U.S. Appl. No. 13/161,132 dated Jun. 21, 2012.
Notice of Allowance issued by Russian Patent Office in Russian Application No. 2011124508 dated Sep. 3, 2012.
Office Action issued by Japanese Patent Office in Japanese Application No. 2008-284156 dated Oct. 23, 2012.
Office Action issued by Chinese Patent Office in Chinese Application No. 200980150373.4 dated Jun. 5, 2013.

* cited by examiner

METHOD FOR MANUFACTURING OPTICAL FIBER AND OPTICAL FIBER

CROSS-REFERENCE TO RELATED APPLICATION

This is a Continuation Application of International Application No. PCT/JP2010/002761, filed Apr. 16, 2010, which claims priority to Japanese Patent Application No. 2009-100044, filed Apr. 16, 2009. The contents of the aforementioned application are incorporated herein by reference.

BACKGROUND OF THE INVENTION

1. Field of the Invention

The present invention relates to a method for drawing an optical fiber preform to manufacture an optical fiber, in a manufacturing process of an optical fiber.

2. Description of the Related Art

FIG. 15 is a schematic configuration view showing a general apparatus for manufacturing an optical fiber. A method for manufacturing an optical fiber using this manufacturing apparatus includes the following steps.

(1) Inserting an optical fiber preform 101 which is formed from a glass rod which becomes a source of an optical fiber into a heating furnace 102. Then, a tip of the optical fiber preform 101 is heated and melted at a temperature of about 2000° C. by a heater 102a, and a bare optical fiber 103 is drawn out downward from the heating furnace 102.

(2) Cooling the drawn-out bare optical fiber 103 by a cooling device 104 provided under the heating furnace 102. The cooling device 104 includes a vertically long cooling cylinder. A cooling gas (helium gas or the like) is supplied to the inside of this cooling cylinder from a side portion of the cooling cylinder. In FIG. 15, a flow 110 of the cooling gas indicated by an arrow towards an upper portion and a lower portion within the cooling cylinder, and the bare optical fiber 103 drawn out from the heating furnace 102 is sufficiently cooled by this cooling gas until the bare optical fiber 103 reaches a temperature capable of coating.

(3) Coating a coating resin on the periphery of the bare optical fiber 103 for the purpose of protection of the surface of an optical fiber glass, thereby forming a protective covering layer to obtain an optical fiber 107. First, the coating resin is coated on the cooled bare optical fiber 103 by a coating device 106. Next, this coating resin is heat-cured or ultraviolet-cured by the curing device 108, and is formed as a protective covering layer. Generally, this protective covering layer is formed with a two-layer structure. Coating is performed using a material with a low Young's modulus for an inner layer and using a material with a high Young's modulus for an outer layer.

(4) Winding the optical fiber 107 on which the protective covering layer has been formed to a winding machine (not shown) via a turn pulley 109.

Currently, along with improvement in productivity or cost reduction of optical fibers, enlargement of an optical fiber preform and speeding up of fiber drawing speed (hereinafter referred to as drawing speed) are being pursued. The following phenomena occur with the speeding up of the drawing speed.

The length of the cooling device required for cooling a bare optical fiber increases.

The flow rate per unit time of the cooling gas which flows alongside the bare optical fiber which comes out from the heating furnace increases.

The flow rate per unit time of the cooling gas which flows out of the inside of the cooling device along with the bare optical fiber increases.

From the above, the concentration of the cooling gas within the cooling device decreases with the speeding up in the drawing speed, and the cooling capacity of the cooling device declines. As a result, there is a case where cooling of the bare optical fiber within the cooling device becomes insufficient, and the external diameter (hereinafter referred to as coating diameter) of the protective covering layer becomes small, or there is a case where cooling of the bare optical fiber becomes unstable, and a fluctuation in the coating diameter increases. In order to solve the above problems, there is a demand for a cooling device with an improved cooling capacity and with a stable cooling capacity.

Generally, factors causing fluctuation of the coating diameter include, for example, a change in the temperature of the bare optical fiber when coating the coating resin, a change in the shear rate of the coating resin in a dice land within the coating device, and the like.

The change in the temperature of the bare optical fiber when covering the coating resin appears as a change in the cooling capacity of the cooling device when the bare optical fiber drawn out from the optical fiber preform is cooled until its temperature, due to the cooling gas, reaches a temperature at which it is capable of being coated, within a range of the drawing speed (the range of the drawing speed which fluctuates during manufacture of products, and center drawing speed±X (m/min)). This change in the cooling capacity has a great influence on the change in the coating diameter. Accordingly, it is desirable that the cooling device has the capacity to always cool the bare optical fiber stably, and the capacity capable of appropriately adjusting the temperature of the bare optical fiber within a drawing speed range which fluctuates during manufacture of products.

On the other hand, the shear rate of the coating resin in the dice land within the coating device mainly changes depending on a change in viscosity due to a change in the temperature of the coating resin or a change in the supply pressure of the coating resin into the coating device. However, within the drawing speed range, it may be considered that the influence that these changes have on the fluctuation in the coating diameter is small, and is almost non-existent.

As a technique for solving such problems, there is a method disclosed in Patent Literature 1 (Japanese Patent No. 4214389). The method described in Patent Literature 1 performs fiber drawing of an optical fiber preform 201, using a cooling device 211 including a fiber inlet portion and a fiber outlet portion of a bare optical fiber 204 as shown in FIG. 16, such that the pressure loss from a cooling gas introduction port to the fiber inlet portion of the bare optical fiber 204 is made lower than the pressure loss from the cooling gas introduction port to the fiber outlet portion of the bare optical fiber 204. In order to realize this method, a cooling method in which the fiber outlet portion of the bare optical fiber 204 is covered (sealed) with a resin coating device 205 is described in Patent Literature 1. Thereby, in practice, an outlet for the cooling gas introduced into the cooling device 211 becomes only the fiber inlet portion (upper portion) of the bare optical fiber 204 of the cooling device 211. Accordingly, the gas which is going to flow into the cooling device 211 along with the bare optical fiber 204 can be efficiently stripped off from the bare optical fiber 204, and the cooling efficiency of the cooling device 211 can be improved.

However, in the technique described in Patent Literature 1, in order to strip the gas accompanying the bare optical fiber off from the bare optical fiber, the flow of the cooling gas within the cooling device 211 is used as an upward flow by adjusting the pressure loss. In particular, in the technique described in Patent Literature 1, the fiber outlet portion of the bare optical fiber 204 of the cooling device 211 is covered with the resin coating device 205. Therefore, an inlet portion for ambient air into the cooling device 211 becomes only the fiber inlet portion (upper portion) of the bare optical fiber 204 of the cooling device 211, and the gas accompanying the bare optical fiber 204 can be efficiently stripped off from the bare optical fiber 204. Additionally, in the technique described in Patent Literature 1, a place where external gas is mixed into the cooling device 211 is only the upper portion of the cooling device 211. However, the upper portion of the cooling device 211 becomes a discharge port for the cooling gas from the inside of the cooling device 211. Therefore, the mixing of the external gas into the inside of the cooling device 211 is minimized, and the concentration of the cooling gas within the cooling device 211 becomes very high. As a result, the amount of the cooling gas used can be reduced. Moreover, the concentration of the cooling gas within the cooling device 211 becomes very high, and the heat exchange between the bare optical fiber 204 and the cooling gas and the heat exchange between the cooling gas and the cooling device 211 are efficiently performed.

However, the technique described in Patent Literature 1 has a problem that the cooling capacity of the cooling device 211 improves excessively, and the responsiveness of the cooling capacity to a change in the flow rate of the cooling gas becomes too agile. In the fiber drawing step of the optical fiber preform 210, exchange (flow of the cooling gas) of the cooling gas within the cooling device 211 may become non-uniform due to a disturbance. Here, the term "disturbance" means a fluctuation in the drawing speed (for example, a change of 60 m/min$^2$ or more) accompanying an instantaneous change in the external diameter (for example, an external diameter change of a standard external diameter (generally 125 μm) of ±1 μm or more caused within several seconds) of the bare optical fiber 204 resulting from air bubbles or foreign matter mixed into the optical fiber preform 201, a fluctuation in the drawing speed (for example, a change of 30 m/min$^2$ or more) accompanying a change in the external diameter of the optical fiber preform 201 (particularly, a change in the external diameter resulting from the portions of the tip portions and end portion of the optical fiber preform 201 where the mean external diameter of the optical fiber preform 201 changes by ±1 μm or more), and a temperature change (temperature change of, for example cooling water or inner wall, of the cooling device until the drawing speed becomes a normal drawing speed from the start of fiber drawing) accompanying a change over time of the cooling device. Since the responsiveness of the cooling capacity of the cooling device 211 is too agile in the technique described in Patent Literature 1, a problem occurs in that the cooling capacity of the cooling device 211 becomes unstable due to the flow of the non-uniform cooling gas generated by this disturbance.

In the technique described in Patent Literature 1, even in a case where the cooling gas flow rate has changed by a very small amount to adjust the cooling capacity according to the drawing speed fluctuation when the drawing speed becomes normal (manufacture center drawing speed or normal drawing speed), a change in the cooling capacity becomes large. Due to the change in the cooling capacity, there is a change in not only the heat exchange between the bare optical fiber and the cooling gas but also in the heat exchange between the cooling gas and the cooling device. Particularly, in the technique described in Patent Literature 1, the influence of these changes is great. Therefore, it is difficult to keep the coating diameter constant by a feedback control (for example, PID control) of a constant value.

On the other hand, if PID setting values which make feedback control insensitive are used, the coating diameter cannot be kept constant. As a result, there is a problem in that the coating diameter fluctuation increases and the percentage of defective manufactured optical fibers increases.

SUMMARY

The invention has been made in view of the above circumstances, and the object thereof is to provide a method for manufacturing an optical fiber which can reduce the amount of cooling gas used, can maintain the responsiveness of a cooling device appropriately even in the above disturbances, and can cool a bare optical fiber stably.

In order to solve the above problems, the invention has adopted the followings.

(1) A method for manufacturing an optical fiber of an aspect of the invention includes: melting and deforming an optical fiber preform in a heating furnace; drawing out a melted and deformed part of the optical fiber preform as a bare optical fiber; forcibly cooling the bare optical fiber using a cooling device; forming a protective covering layer on the bare optical fiber, which has been forcibly cooled using a coating device; and curing the protective covering layer using a curing device, wherein a flow of a cooling gas within the cooling device is made to be an upward flow and the cooling gas is discharged to outside from an upper end of the cooling device, by connecting the cooling device and the coating device in an airtight manner, and closing a flow of the cooling gas which flows toward the coating device side within the cooling device using a meniscus of resin within the coating device, and a temperature of the cooling gas is increased toward an upper portion of the cooling device from a lower portion of the cooling device by adjusting a flow rate of the cooling gas.

(2) In the method for manufacturing an optical fiber described in the above (1), helium gas and carbon dioxide gas may be used as the cooling gas; the helium gas may be introduced from any position between the lower portion of a cooling device and the meniscus of the resin within the coating device; and the carbon dioxide gas may be introduced from any position between the lower portion of the cooling device and the meniscus of the resin within the coating device, and below a place where the helium gas is introduced.

(3) In the method for manufacturing an optical fiber described in the above (1) or (2), the cooling device and the coating device may be connected using a connecting member.

(4) In the method for manufacturing an optical fiber described in any one of the above (1) to (3), a flow rate of the helium gas and a flow rate of the carbon dioxide gas may be adjusted based on a temperature of a mixed gas of the helium gas and the carbon dioxide gas at the upper end of the cooling device, and a temperature of the mixed gas at an introduction port through which the helium gas is introduced.

(5) In the method for manufacturing an optical fiber described in any one of the above (1) to (4), the relational expression $[t_{gas} \times 2(° C.) \leq (T_{gas}(° C.) \leq [t_{gas} \times 4(° C.)]$ may be satisfied when temperature of the mixed gas at the upper end of the cooling device is defined as $T_{gas}$ and the temperature of the mixed gas at the introduction port is defined as $t_{gas}$.

(6) In the method for manufacturing an optical fiber described in any one of the above (1) to (5), a space filled with the carbon dioxide gas may be formed on a lower portion side which is lower than a position where the helium gas is introduced.

(7) In the method for manufacturing an optical fiber described in any one of the above (2) to (6), a partition may be provided between a position where the helium gas is introduced and a position where the carbon dioxide gas is introduced, and a bare optical fiber may be pass through a hole with a diameter of 1 to 5 mm provided at a central portion of the partition.

(8) In the method for manufacturing an optical fiber described in any one of the above (3) to (7), the helium gas may be introduced from the lower portion of the cooling device; and the carbon dioxide gas may be introduced from the connecting member.

(9) In the method for manufacturing an optical fiber described in any one of the above (3) to (7), the helium gas may be introduced from the connecting member; and the carbon dioxide gas may be introduced from the coating device.

(10) In the method for manufacturing an optical fiber described in the above (9), the carbon dioxide gas may be introduced from an upper portion of the coating device.

(11) In the method for manufacturing an optical fiber described in the above (1), helium gas and carbon dioxide gas may be used as the cooling gas; and after the helium gas and the carbon dioxide gas are mixed, the mixed gas may be introduced from any position between a lower portion of the cooling device and an upper portion of the coating device.

(12) In the method for manufacturing an optical fiber described in any one of the above (1) to (11), the surface area of the inner wall of the cooling device may be determined in advance.

In the method for manufacturing an optical fiber described in the above (1), the flow of the cooling gas within the cooling device is made to be an upward flow, and the cooling gas is discharged to outside from the upper end of the cooling device, by connecting the cooling device and the coating device in an airtight manner, and closing the flow of the cooling gas which flows toward the coating device side within the cooling device using the resin within the coating device. That is, the flow of the mixed gas of the helium gas and the carbon dioxide gas is made to be an upward flow which is stable toward the upper portion of the cooling device from the lower portion thereof. Thereby, the external gas which enters the cooling device from the upper portion of the cooling device along with the bare optical fiber can be reduced to a limit, and the concentration of the helium gas within the cooling device is increased.

Additionally, in the method for manufacturing an optical fiber described in the above (1), the temperature of the mixed gas is increased toward the upper portion of the cooling device from the introduction port for the cooling gas by adjusting the flow rate of the helium gas and the flow rate of the carbon dioxide gas. Thereby, since the transfer of the heat from the bare optical fiber to the cooling gas can be made to be gentle in the upper portion of the cooling device, the responsiveness of adjustment of the cooling capacity can be appropriately performed. In addition, since the cooling capacity can be adjusted to a stable range for manufacture, the bare optical fiber can be introduced into the coating device in a state where the temperature of the bare optical fiber forcibly cooled in the cooling device is uniform, the influence of the above disturbances is suppressed, and the diameter of the protective covering layer formed on the bare optical fiber can be made uniform.

In the method for manufacturing an optical fiber described in the above (6), the space filled with the carbon dioxide gas is formed on the lower portion side which is lower than the position where the helium gas is introduced. Thereby, since sufficient carbon dioxide gas exists in the vicinity of the coating resin in the coating device, bubbles can be prevented from being mixed into the protective covering layer.

According to the method for manufacturing an optical fiber described in the above (7), the concentration of the carbon dioxide gas can be increased by separating the space. As a result, the mixing of bubbles into the protective covering layer can be prevented.

According to the method for manufacturing an optical fiber described in the above (10), since the mixture of the helium gas and the carbon dioxide gas becomes uniform, the temperature of the mixed gas can be controlled with excellent reproducibility, and stability of the cooling capacity of the cooling device can be made very high.

EMBODIMENTS FOR CARRYING OUT THE INVENTION

Hereinafter, embodiments of the invention will be described in detail. The embodiments will be specifically described in order to facilitate understanding of the idea of the invention, and, in the absence of any particular specification, does not limit the invention.

Figure 1:
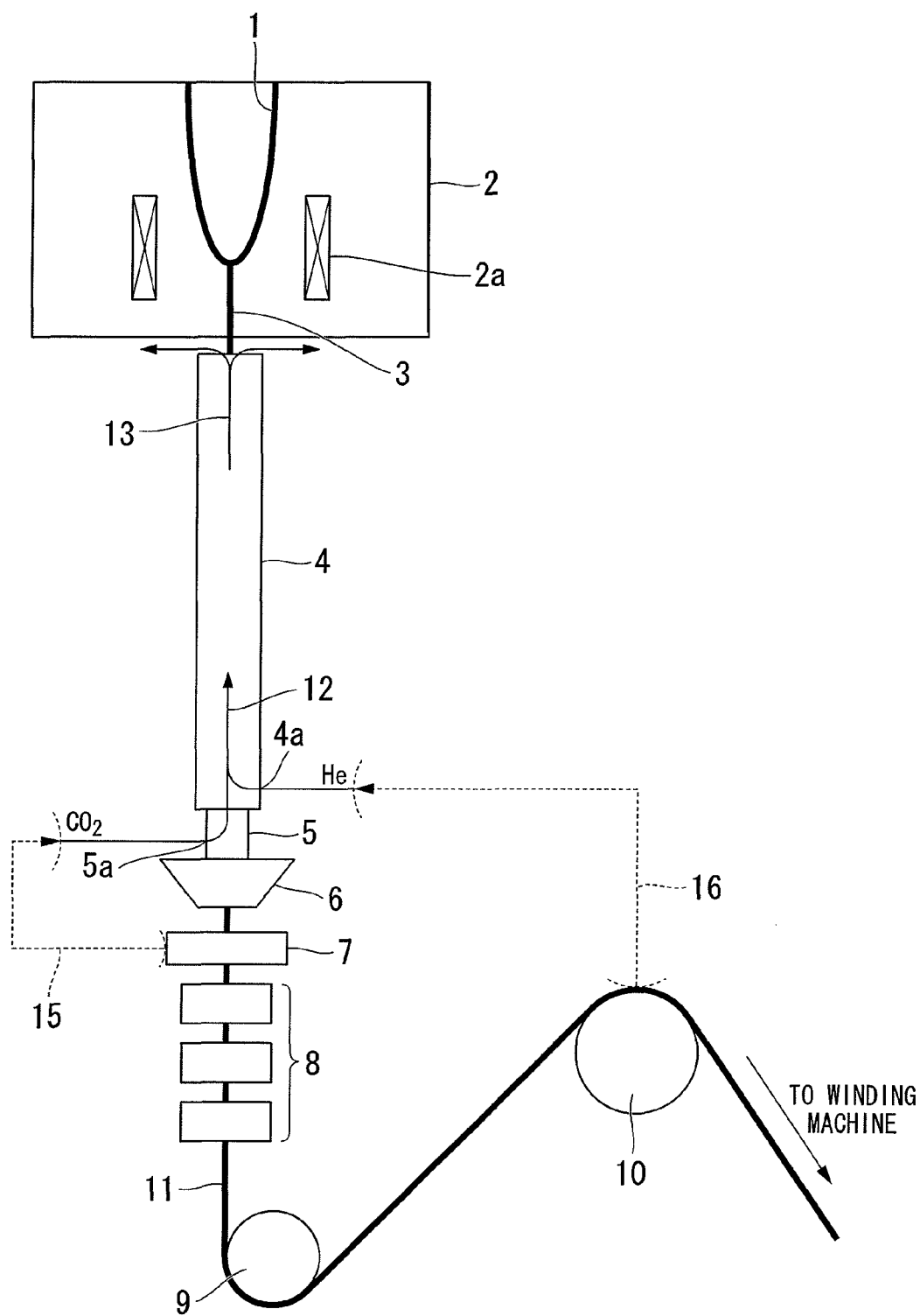
FIG. 1 is a schematic configuration view showing an apparatus for manufacturing an optical fiber which is used for a method for manufacturing an optical fiber of the invention.

FIG. 1 is a schematic configuration view showing an apparatus for manufacturing an optical fiber which is used for a method for manufacturing an optical fiber of the invention.

This apparatus for manufacturing an optical fiber includes a heating furnace 2 with a heater 2a, a cooling device 4, a coating device 6, a tubular connecting member 5 for connecting the cooling device 4 and the coating device 6, an external diameter measuring instrument 7, a curing device 8, a turn pulley 9, and a take-up machine 10.

The connecting member 5 is installed between the cooling device 4 and the coating device 6, and the connecting member 5 connects the cooling device 4 and the coating device 6 in an airtight manner. By providing the connecting member 5 between the cooling device 4 and the coating device 6, the connecting member 5 can be contracted to secure space when a bare optical fiber is made to pass through the coating device 6 at the time of starting the fiber drawing. Therefore, the operation can be started without deteriorating workability.

A side face of the lower portion of the cooling device 4 is formed with an introduction port 4a for helium gas. A side face of the connecting member 5 is formed with an introduction port 5a for carbon dioxide gas. In this embodiment, helium gas and carbon dioxide gas are used as the cooling gas. Hereinafter, these gases may be collectively referred to as cooling gas or mixed gas.

A thermocouple (not shown) for measuring the temperature of the mixed gas of the helium gas introduced from the introduction port 4a and the carbon dioxide gas introduced from the introduction port 5a is arranged at the lower portion of the cooling device 4. A thermocouple (not shown) for measuring the temperature of the mixed gas discharged from the cooling device 4 is arranged at the upper end of the cooling device 4. The temperature information from these thermocouples (temperature measurement member) is sent to a control device (not shown).

Figure 2:
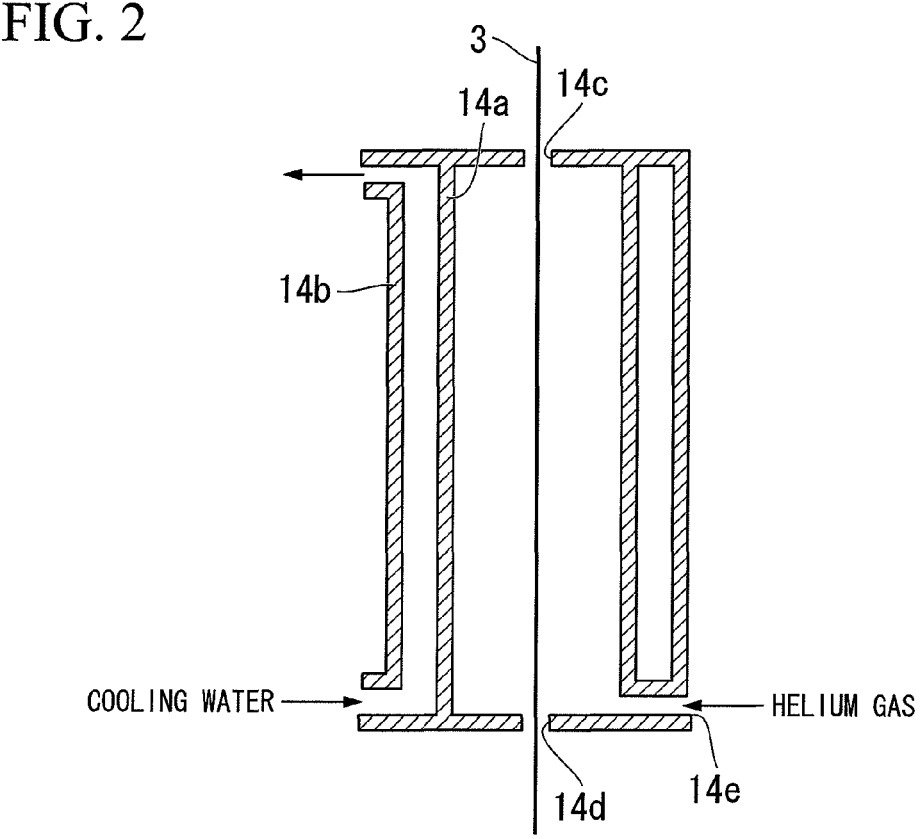
FIG. 2 is a schematic sectional view showing a cooling device used for the method for manufacturing an optical fiber of the invention.

As the cooling device 4, for example, a cooling device having the structure as shown in FIG. 2 is used.

The cooling device 4 includes a cooling cylinder 14a and a circulating water cylinder 14b. An opening 14c into which a bare optical fiber 3 is inserted are formed at an upper end of the cooling cylinder 14a. An opening 14d from which the bare optical fiber 3 is extracted are formed at a lower portion of the cooling cylinder 14a. Additionally, an introduction port 14e (equivalent to the above introduction port 4a) which introduces cooling gas (helium gas) is formed at the lower portion of the cooling cylinder 14a. Cooling water is introduced into and circulated through the circulating water cylinder 14b.

The bare optical fiber 3 is cooled by the heat exchange between the cooling gas and the circulating water while passing through the cooling cylinder 14a, passes through the connecting member 5, and is fed into the coating device 6 which coats coating resin which becomes a protective covering layer.

In this embodiment, a plurality of such cooling devices 4 is connected together and used. In this case, the helium gas is introduced from the introduction port 4a (14e) of the cooling device 4 (cooling cylinder 14a) arranged at the lowermost portion, and the introduction port 4a (14e) of another cooling device 4 (cooling cylinder 14) has a closed configuration.

The external diameter measuring instrument 7 measures the external diameter (hereinafter referred to as coating diameter) of a bare optical fiber (i.e., optical fiber) on which coating resin has been coated. The external diameter measuring instrument 7 is connected to a first control device (not shown) via a cable 15. This first control device controls the flow rate of the carbon dioxide gas which flows into the cooling device 4 from the introduction port 5a of the connecting member 5.

The take-up machine 10 is connected to a second control device (not shown) via a cable 16. This second control device controls the flow rate of the helium gas which flows into the cooling device 4 from the introduction port 4a of the cooling device 4. The drawing speed of the optical fiber 11 is calculated from the rotating speed of the take-up machine 10.

A method for manufacturing an optical fiber using this apparatus for manufacturing an optical fiber will be described.

An optical fiber preform 1 is melted and deformed in the heating furnace 2, and is drawn out of an outlet of the heating furnace 2 as the bare optical fiber 3.

Next, the bare optical fiber 3 is forcibly cooled by the cooling device 4 which is installed below the heating furnace 2 and is not connected to the heating furnace 2.

Next, the cooled bare optical fiber 3 is coated with coating resin by the coating device 6 installed below the cooling device 4 to form the optical fiber 11.

The coating diameter of the optical fiber 11 on which coating resin has been coated (external diameter of the optical fiber 10) is measured by the external diameter measuring instrument 7.

Next, the coating resin is cured by the curing device 8, and the optical fiber 11 on which a protective covering layer has been formed around the bare optical fiber is obtained.

Next, the optical fiber 11 is wound around a winding machine (not shown) via the turn pulley 9 and the take-up machine 10.

In the method for manufacturing an optical fiber of this embodiment, the space, which is closed by the cooling device 4, the connecting member 5, the coating device 6, and the face (meniscus) of the coating resin inside the coating device 6, is formed below the cooling device 4. Thereby, the flows of the cooling gas inside the cooling device 4 and inside the connecting member 5 forcibly become upward flows 12 and 13 except for a portion of the gas which flows along with the bare optical fiber 3, and the cooling gas is discharged to the outside only from the upper end of the cooling device 4.

Even in a case where the flow rate of the cooling gas within the cooling device 4 has changed or a case where a flow of unstable gas has been generated depending on the fiber drawing conditions of an optical fiber, the flow of the cooling gas becomes stable upward flows 12 and 13 due to the above flow of the cooling gas. As a result, stable cooling capacity of the cooling device 4 is obtained.

The cooling device 4 and the coating device 6 may be connected together using the connecting member 5 or the cooling device 4 and the coating device 6 may be directly connected together. The connection between the cooling device and the coating device is not particularly limited if the same effects are obtained. In a case where the cooling device 4 and the coating device 6 are directly connected together, the introduction port 5a for carbon dioxide gas may be formed in the coating device 6.

The cooling gas which becomes the upward flows 12 and 13 is forcibly jetted to the outside from the upper end of the cooling device 4 which can also be an entry port of external gas into the cooling device 4. Therefore, the mixing of the gas into the cooling device 4 from the outside can be kept to the minimum. Hence, the concentration of the cooling gas within the cooling device 4 is increased to the maximum. Particularly in a case where helium gas is used as the cooling gas, the amount of the helium gas used can be significantly reduced.

Specifically, the flow rate of the helium gas is significantly reduced to about 50% from about 5% in the conventional technique. Since the flow rate of the helium gas can be greatly reduced, the manufacturing costs of optical fibers can be suppressed, and the optical fibers can be manufactured at a low price.

In this embodiment, carbon dioxide gas is made to flow into the cooling device 4 in addition to the helium gas.

The helium gas and the carbon dioxide gas are introduced into any of the cooling device 4, the connecting member 5, and the coating device 6. In this case, the helium gas and the carbon dioxide gas are separately introduced into the cooling device 4, the connecting member 5, and the coating device 6. As an example, in a case where the helium gas is introduced into the lower portion of the cooling device 4, the carbon dioxide gas is introduced from the side lower than the position where the helium gas is introduced, and is introduced between resin faces in the coating device 6 from the lower portion of the cooling device 4. That is, the carbon dioxide gas is introduced into the lower portion of the connecting member 5 or the upper portion of the coating device 6. In a case where the helium gas is introduced into the upper portion of the connecting member 5, the carbon dioxide gas is introduced into the upper portion of the coating device 6. Among them, it is preferable to introduce the helium gas into the lower portion of the cooling device 4, and to introduce the carbon dioxide gas into the lower portion of the connecting member 5.

By introducing the cooling gas in this way, the space filled with the carbon dioxide gas is formed on the side lower than the position where the helium gas is introduced. Thereby, since sufficient carbon dioxide gas exists in the vicinity of the coating resin in the coating device 6, bubbles can be prevented from being mixed into the protective covering layer. In this case, a partition may be provided between the position where the helium gas is introduced and the position where the carbon dioxide gas is introduced. Thereby, the space filled with high-concentration carbon dioxide gas is formed, such that bubbles can be more effectively prevented from being mixed into the protective covering layer. In this case, a hole with a diameter of about 1 to 5 mm which allows a bare optical fiber to pass therethrough is formed at a central portion of the partition. If the diameter of the hole becomes smaller than 1 mm, the hole becomes apt to come into contact with a bare optical fiber, which is unsuitable, and if the diameter of the hole becomes larger than 5 mm, the separating effect by the partition is reduced.

As for the positional relationship between the introduction ports for helium gas and carbon dioxide gas, a place into which the helium gas is made to flow becomes the downstream of a flow of an upward cooling gas, and a place into which the carbon dioxide gas is made to flow becomes the upstream of the flow of the upward cooling gas.

Thereby, the flow of the cooling gas becomes the upward flows 12 and 13, and each gas flows stably. Therefore, adjustment of the concentration of the carbon dioxide gas in the longitudinal direction of the connecting member 5 is possible, the concentration of the carbon dioxide gas becomes highest in the vicinity of the coating device 6, and it is possible to prevent bubbles from being mixed into the protective covering layer and remaining therein.

Moreover, since the mixed state of the helium gas and carbon dioxide gas which flow into the upper portion (downstream) of the cooling device 4 is also always stable, the cooling capacity of the cooling device 4 is stabilized without becoming unstable according to a drawing speed. Therefore, when the flow rate of these gases is changed according to a drawing speed, the cooling capacity of the cooling device 4 can be adjusted with excellent responsiveness, and the bare optical fiber 3 can be coated with coating resin with a constant coating diameter.

The cooling efficiency (cooling capacity) of the cooling device 4 can be adjusted by adjusting individually the flow rate of the helium gas made to flow into the lower portion of the cooling device 4 or the upper portion of the connecting member 5 and the flow rate of the carbon dioxide gas made to flow into the upper portion of the coating device 6 or the lower portion of the connecting member 5.

In this embodiment, the temperature of the cooling gas within the cooling device 4 increases toward the upper portion of the cooling device 4 from the introduction port 4a for helium gas of the lower portion (or upper portion of the connecting member 5) of the cooling device 4. Therefore, the temperature of the mixed gas becomes high (the temperature is lower than the surface temperature of the bare optical fiber 3) in a region where the bare optical fiber 3 at the upper portion of the cooling device 4 has a high temperature. As a result, the transfer of the heat generated by a difference in temperature between the surface temperature of the bare optical fiber 3 and the temperature of the mixed gas becomes gentle.

On the other hand, the temperature of the mixed gas becomes lower than the temperature of the surface of the bare optical fiber 3, in a region where the bare optical fiber at the lower portion of the cooling device 4 has a low temperature. Therefore, the transfer of heat to the mixed gas from the surface of the bare optical fiber 3 occurs, such that the cooling of the bare optical fiber 3 can be maintained.

From the above, irrespective of whether or not the concentration of the helium gas within the cooling device 4 is high, the responsiveness to adjustment of the cooling capacity becomes appropriate (not too sensitive or too insensitive), and coating of a protective covering layer with a constant coating diameter becomes possible over the overall length of an optical fiber which is drawn.

Here, the temperature of the mixed gas at the upper end of the cooling device 4 and the temperature of the mixed gas in the introduction port 4a are measured by the thermocouples, and the flow rate of the mixed gas is adjusted such that these temperatures satisfy the following relational expressions.

$$[t_{gas} \times 2(° C.)] \leq T_{gas}(° C.) \leq [t_{gas} \times 4(° C.)]$$

$T_{gas}$ is the temperature of the mixed gas at the upper end of the cooling device 4, and $t_{gas}$ is the temperature of the mixed gas in the introduction port 4a.

As the temperature of the mixed gas, strictly, a temperature distribution is formed in the vicinity of a surface portion of the bare optical fiber 3, in the vicinity of the inner wall of the cooling device 4, and at an intermediate portion between this surface portion and this inner wall. Therefore, it is difficult to strictly express which the portion temperature is selected as the temperature of the mixed gas. Therefore, in this embodiment, the temperature measured by installing a thermocouple at an intermediate position between the bare optical fiber 3 and the inner wall of the cooling device 4 is defined as the temperature of the mixed gas.

In the case of $[t_{gas} \times 2(° C.)] > T_{gas}$, the responsiveness to the adjustment of the cooling capacity of the cooling device 4 is too quick.

In the case of $T_{gas} > [t_{gas} \times 4(° C.)]$, the stability of the cooling capacity against the disturbance is deficient. Moreover, since the cooling efficiency decreases, longer cooling length is required for the cooling device 4 (although the representative temperature within the cooling device 4 (the above measurement temperature) becomes the upper limit of the temperature [$t_{gas} \times 4$(° C.)], it is estimated that the actual temperature in the vicinity of the bare optical fiber 3 is hundreds of degrees or higher).

As the temperature range of the mixed gas at the upper end of the cooling device 4 satisfies the above relational expression, as mentioned above, the responsiveness to the adjustment of the cooling capacity becomes appropriate, and even in a case where the above disturbance has occurred, the cooling of the bare optical fiber 3 can be maintained. Therefore, coating of a protective covering layer with a constant coating diameter becomes possible over the overall length of an optical fiber which is drawn and fabricated.

Specific conditions will be described below.

When a convective heat transfer coefficient is defined as a [J/m²/K], the solid surface area is defined as S [m²], the solid temperature is defined as $T_{solid}$ [° C.], and the temperature of a gas (cooling gas) is defined as $T_{gas}$ [° C.], generally, the quantity of heat Q [J] which moves between a solid and a gas which is a flow around the solid is expressed by the following Expression (1).

$$Q = \alpha S (T_{solid} - T_{gas}) \quad (1)$$

Here, the convective heat transfer coefficient α is expressed by the following Expression (2).

$$\alpha = c \cdot \lambda \cdot u^m \cdot d^{m-1} \cdot v^{n-m} \cdot a^{-n} \quad (2)$$

Here, the respective symbols represents c: proportional factor, λ: heat conductivity of gas, u: flow velocity of gas, d: representative length of solid, v: kinematic viscosity (=viscosity/density) of gas, and a: thermal diffusivity (=heat conductivity/density/specific heat capacity) of the gas, m and n are coefficients which take values of m=0.5 to 0.8, and n=0.2 to 0.5, and vary according to the flow of the gas. From the above, the convective heat transfer coefficient is determined according to the kind of a gas to be used, the flow velocity of the gas relative to the surface of the solid, and the flow of the gas.

That is, when the inside of the cooling device 4 is described, the balance $Q_{fiber \to gas}$ of the heat between the bare optical fiber 3 and the cooling gas therearound is dependent on the temperature difference between the temperature of the bare optical fiber 3 and the cooling gas around the bare optical fiber 3, the relative velocity of the cooling gas within the cooling device 4 to the bare optical fiber 3, and the flow pattern of the cooling gas. On the other hand, the balance $Q_{gas \to cool}$ of the heat between the surrounding cooling gas and the cooling device 4 is dependent on the temperature difference between the temperature of the inner wall of the cooling device 4 and the cooling gas within the cooling device 4, the relative velocity of the cooling gas within the cooling device 4 to the inner wall of the cooling device 4, and the flow pattern of the cooling gas.

When Expression (2) is substituted into Expression (1), $Q_{fiber \to gas}$ and $Q_{gas \to cool}$ are as follows.

$$Q_{fiber \to gas} = c \cdot \lambda \cdot u^m \cdot d^{m-1} \cdot v^{n-m} \cdot a^{-n} \cdot S_{fiber} \cdot (T_{fiber} - T_{gas})$$

$$Q_{gas \to cool} = c \cdot \lambda \cdot u^m \cdot d^{m-1} \cdot v^{n-m} \cdot a^{-n} \cdot S_{cool} \cdot (T_{gas} - T_{cool})$$

From the above, the following can be said.

(1) In order to slow down the transfer of heat to the cooling gas from the bare optical fiber 3, the temperature of the cooling gas may be made high.

(2) In order to slow down the transfer of heat to the cooling gas from the bare optical fiber 3, the flow velocity of cooling gas may be made slow (the flow rate of the cooling gas is reduced) (because the flow of the cooling gas is an upward flow which opposite to the traveling direction of the bare optical fiber 3 in the invention).

(3) In order to slow down the transfer of heat to the cooling device 4 from the cooling gas, the temperature (generally, refrigerant temperature) of the cooling device 4 may be raised.

(4) In order to slow down the transfer of heat to the cooling device 4 from the cooling gas, the surface area of the inner wall of the cooling device 4 may be made small.

(5) In order to slow down the transfer of heat to the cooling device 4 from the cooling gas, the flow velocity of the cooling gas may be made slow (the flow rate of the cooling gas is reduced).

Here, (2) and (5) are the same parameters. Additionally, it is necessary to change the temperature of the cooling device 4 in the longitudinal direction regarding (3). It is possible to change the refrigerant temperature in the longitudinal direction of the cooling device 4. However, since the heat capacity of a refrigerant is large, it is difficult to change the temperature of the refrigerant in a short time. In the invention, in order to realize (1), the temperature of the cooling gas within the cooling device 4 is adjusted by optimizing (2), (5), and (4). In this regard, since the present conditions depend on the cooling device 4 actually used and the actual flow of the cooling gas, it is necessary to adjust the conditions for each cooling device. However, the feature of the invention is to set the temperature of the cooling gas to be within a specified range, and the configuration or structure of the cooling device 4 is not limited if the above temperature can be set to a specified temperature range.

Next, a method of estimating the length of the cooling device 4 required for cooling of the bare optical fiber 3 is shown.

In a state where the cooling device 4 and the coating device 6 are connected together, the length of the cooling device 4 in which the cooling capacity required is obtained is appropriately selected in a state where the cooling capacity is the maximum, i.e., in a state (a state where the flow rate of gases other than the helium gas is set to 0) where the atmosphere within the cooling device 4 is set to a helium gas atmosphere. For example, introduction ports 4a for helium are formed at the lower portion of the cooling device 4 or the upper portion of the connecting member 5, helium gas of 10 Standard Liters per Minute (SLM) is made to flow into the cooling device 4, and the length of the cooling device 4 in which the cooling capacity required is acquired is determined.

The length of the cooling device 4 required cannot be completely determined because the length varies according to the structure (internal diameter, the shape of the surface of the inner wall, the material of the inner wall, the temperature of cooling water, and the like) of the cooling device 4. However, the cooling device 4 is required to cool a bare optical fiber to a required temperature, at least at a maximum drawing speed for which it is estimated that the manufactured optical fiber becomes a good article and in an ideal state where the concentration of the helium gas is high. The method for manufacturing an optical fiber of this embodiment does not depend particularly on the configuration or structure of the cooling device if the cooling device 4 applicable to a drawing speed up to the above maximum drawing speed is used.

Figure 3:
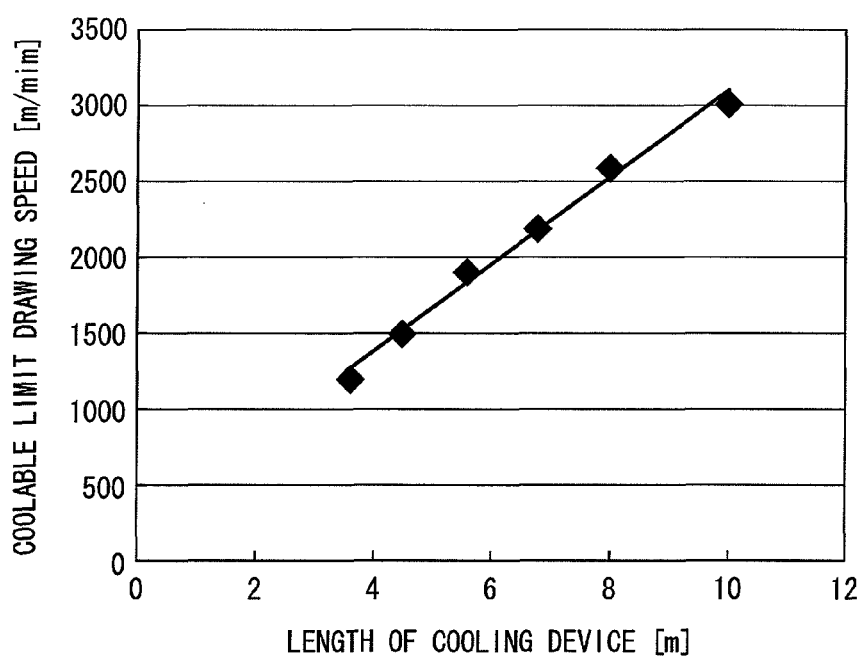
FIG. 3 is a graph showing results obtained through experiment regarding the relationship between the length of the cooling device and a coolable limit drawing speed.

Here, the verified results about the dependency of the required length of the cooling device 4 on the drawing speed when using the cooling device 4 shown in FIG. 2 are shown in FIG. 3. A pipe (cooling cylinder) made of brass with an internal diameter of ϕ10 mm may be used as the cooling device 4, and the bare optical fiber 3 is made to pass through this pipe. Then, water of about 20° C. is circulated to the outer periphery of the pipe. The results shown in FIG. 3 are results verified by actually performing experiments. It is confirmed from FIG. 3 that the limit drawing speed (maximum drawing speed) capable of cooling the bare optical fiber 3 is increased by increasing the length of the cooling device 4.

Next, the controllability of the coating diameter will be discussed.

The feed-back control of the flow rate of the helium gas and/or the flow rate of the carbon dioxide gas is performed by a drawing speed signal according to the drawing speed, or a coating diameter signal according to the coating diameter. The drawing speed calculated from the rotating speed of the take-up machine 10 is sent to a second control unit as a drawing speed signal. The second control unit performs feedback control of the flow rate of the helium gas according to this drawing speed signal. The coating diameter measured by the external diameter measuring instrument 7 is sent to a first control unit as the coating diameter signal. The first control unit performs feedback control of the flow rate of the carbon dioxide gas according to this coating diameter signal. In these cases, it is confirmed that the flow rate of the carbon dioxide gas does not become 0 over an overall allowable drawing speed range, the temperature of the cooling gas falls within the above range, the responsiveness is appropriate, the coating diameter can be uniformly controlled, and the resistance to a disturbance is strong.

As a result, it is confirmed that, as the temperature of the cooling gas at the upper end of the cooling device 4 falls within the above temperature range, the responsiveness to the adjustment of the cooling capacity is excellent, and the cooling capacity can also be maintained against a disturbance. These will be demonstrated in the examples which will be described below.

Figure 4:
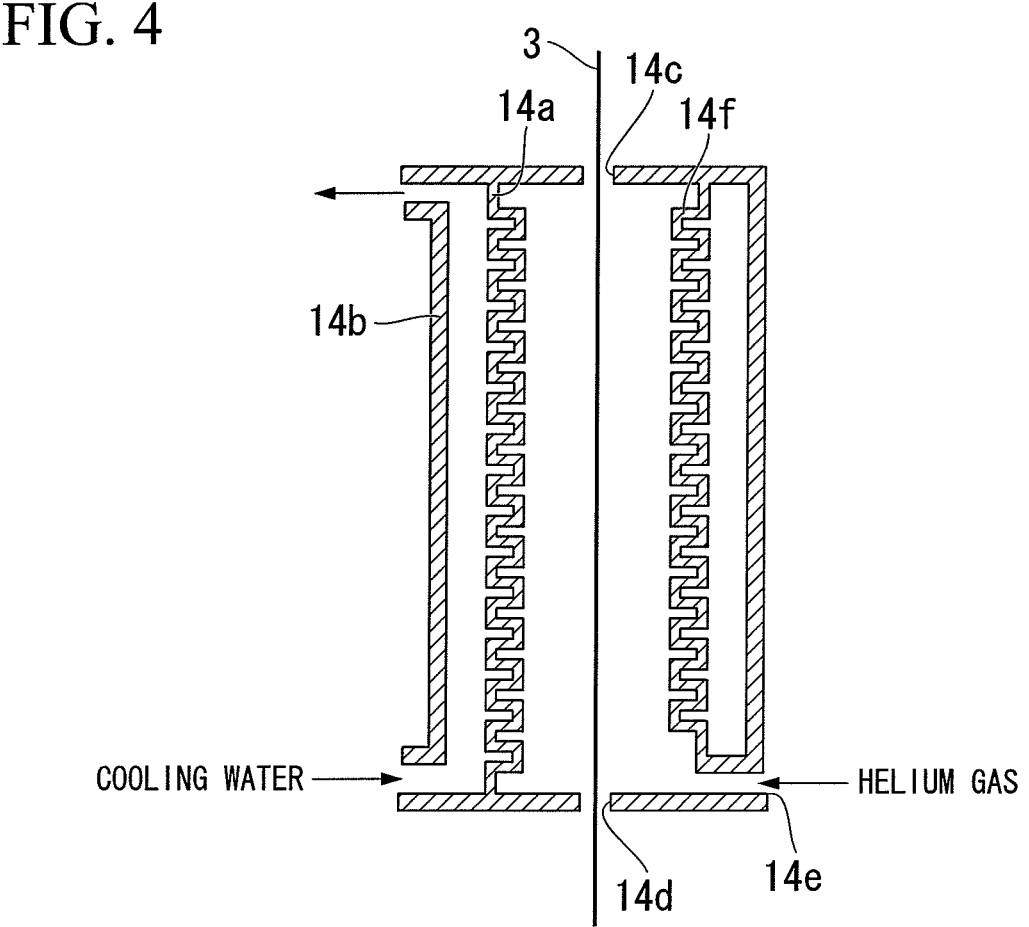
FIG. 4 is a schematic sectional view showing the cooling device having an inner wall including convex portions, which is used for the method for manufacturing an optical fiber of the invention.

Additionally, in this embodiment, as shown in FIG. 4, the inside of the cooling device 4 can be formed into a concavo-convex shape by providing convex portions 14$f$ on the inner wall of the cooling cylinder 14$a$. A plurality of the convex portions 14$f$ can be provided on the same surface of the cooling cylinder 14$a$, and also can be provided in the length direction of the cooling cylinder 14$a$.

By providing the inner wall of the cooling cylinder 14$a$ with the convex portions 14$f$, the heat exchange between the mixed gas around the bare optical fiber 3 and the cooling water within the cooling cylinder 14$a$ is improved.

By appropriately changing the size, shape, configuration, and number of the convex portions 14$f$ to adjust the surface area of inner wall of the cooling device 4, the temperature of the mixed gas can be made high from the gas introduction port 4$a$ of the cooling device 4 toward the upper portion thereof. For example, if the size of the convex portions 14$f$ is gradually reduced and the number of convex portion is increased from the upper portion of the cooling device 4 toward the lower portion (around the gas introduction port 4$a$) thereof, and thus the surface area capable of performing heat exchange is gradually increased, the temperature of the mixed gas at the lower portion (around the gas introduction port 4$a$) of the cooling device 4 can be made low, and this temperature can be made high toward the upper portion.

In the method for manufacturing an optical fiber of the invention, the surface area of the inner wall of the cooling cylinder 14$a$ may be set in advance according to the length of the cooling device 4, the drawing speed, the mixing ratio of the cooling gas, the flow rate and temperature of the cooling gas, or the like.

In this embodiment, the flow rate of the helium gas and the flow rate of the carbon dioxide gas are controlled by independent signals of two or more systems. As the independent signals of two or more systems, the drawing speed signal showing the drawing speed of the optical fiber 11 and the coating diameter signal showing the coating diameter of the optical fiber 11 are used.

The kind of gases to be controlled by the coating diameter signal may be switched according to a drawing speed fluctuation range. Preferably, the flow rate of the helium gas with high heat conductivity is changed by performing feedback control according to the drawing speed signal, and the flow rate of the carbon dioxide gas with low heat conductivity is changed by performing feedback control (PID control) according to the coating diameter signal.

Even in a mixed gas region (region where the carbon dioxide gas which becomes an upward flow and the helium gas accompanying the bare optical fiber 3 are mixed together) of the carbon dioxide gas and the helium gas which is present between the introduction port 5$a$ for carbon dioxide gas and the introduction port 4$a$ for helium gas, the mixed gas of this region becomes an upward flow due to the upward flow of the cooling gas generated from the upstream (coating device 6 side) of this region. Therefore, the flow of the cooling gas within the cooling device 4, the connecting member 5, and the coating device 6 always flows into the upper portion (heating furnace 2 side) of the cooling device 4, and is eventually discharged from the upper end of the cooling device 4. Therefore, in the method for manufacturing an optical fiber of this embodiment, adjustment of the cooling capacity is easy, and the responsiveness is improved.

In the method for manufacturing an optical fiber of this embodiment, it is thereby possible to perform control of the cooling capacity of the cooling device 4 which keeps the coating diameter constant with excellent responsiveness, over a drawing speed range.

In the cooling device 4 of this embodiment, when the flow rate of the gases made to flow into the cooling device 4 is changed according to the drawing speed or the like, the increasing and decreasing directions of each gas to be used are reversed. That is, in a case where the drawing speed is low, the flow rate of the helium gas decreases and the flow rate of the carbon dioxide gas increases. For this reason, as compared to the case where the flow rate of the helium gas with high heat conductivity is fixed, an increase in the carbon dioxide gas becomes small. On the other hand, in a case where the drawing speed is high, the flow rate of the helium gas increases and the flow rate of the carbon dioxide gas decreases. In this embodiment, although the total amount of the flow rate of the gases within the cooling device 4 varies in this way, since little gas enters from the outside and the increasing and decreasing directions of the gases are reversed in relation to each other, the total amount of the flow rate of the cooling gas does not increase significantly. Therefore, shaking of the bare optical fiber 3 is not generated.

In the method for manufacturing an optical fiber of this embodiment, feedback control of the flow rate of the helium gas with high heat conductivity is performed according to the drawing speed signal. Thereby, in a case where the drawing speed is slow, the flow rate of the helium gas is particularly small, and can be reduced even to 0 depending on circumstances. On the other hand, in a case where the drawing speed is high, the flow rate of the helium gas can be increased to an appropriate flow rate capable of cooling the bare optical fiber 3. Here, fine adjustment of the cooling capacity is performed by adjusting the flow rate of each cooling gas after an appropriate cooling length of the cooling device 4 is secured. Therefore, the flow rate of the cooling gas does not increase significantly (for example, 10 L/min or more). As a result, this flow rate does not become a cooling gas flow rate which generates shaking of the bare optical fiber 3.

In the method for manufacturing an optical fiber of this embodiment, feedback control of the flow rate of the carbon dioxide gas with low heat conductivity is performed according to the coating diameter signal. Thereby, when the coating diameter tends to become large, the flow rate of the carbon dioxide gas increases. On the other hand, when the coating diameter tends to become small, the flow rate of the carbon dioxide gas decreases. As a result, the coating diameter can be uniformly controlled.

The case where the helium gas and the carbon dioxide gas are separately introduced into the cooling device, the connecting member, and the coating device has been described in the above embodiment. However, in the invention, after the helium gas and the carbon dioxide gas are mixed together in advance, this mixed gas may be introduced from the lower portion of the cooling device, the connecting member, or the upper portion of the coating device. In this case, similarly to the above embodiment, the helium gas is mixed with the carbon dioxide gas after feedback control of the flow rate of the helium gas is performed according to the drawing speed signal, and the carbon dioxide gas is mixed with the helium gas after feedback control of the flow rate of the carbon dioxide gas is performed according to the coating diameter signal.

EXAMPLES

Hereinafter, the invention will be described in detail with examples.

In a manufacturing process of an optical fiber, the temperature of a bare optical fiber when being introduced into the cooling device is measured using a radiation thermometer.

The temperature of a cooling gas introduced into the cooling device and the temperature of a cooling gas discharged from the cooling device are measured using a thermocouple. The installation position of the thermocouple is set to approximately an intermediate position between the bare optical fiber and the inner wall of the cooling device. The temperature of the cooling gas within the cooling device tends to be the highest in the vicinity of the bare optical fiber, and to become lower toward the inner wall of the cooling device. In practice, the cooling gas in the vicinity of the bare optical fiber becomes a downward flow, along with this bare optical fiber according to the drawing speed of the bare optical fiber. On the other hand, the cooling gas within the cooling device basically becomes an upward flow. From this, it is considered that the downward flow and the upward flow are mixed together, and the flow of the cooling gas is complicated. Therefore, it is considered that the temperature distribution of the cooling gas is also disturbed. Therefore, instead of the temperature of the cooling gas within the cooling device, the temperature of the cooling gas discharged from the cooling device is used as a representative value of the temperature of a gas within the cooling device.

The resistance (disturbance resistance) against the disturbance is defined as follows.

Even in a case where the drawing speed has fluctuated due to a disturbance, stable cooling of the bare optical fiber is possible. As a result of the stable cooling, a fluctuation in the temperature of the bare optical fiber at the outlet of the cooling device becomes small. As a result, the fluctuation in the coating diameter can be suppressed to ±1 µm or less. Here, an external diameter fluctuation factor of the bare optical fiber is excluded (since Measured coating diameter=External diameter of bare optical fiber+Coating diameter thickness is established in a case where the bare optical fibers have varied by 1 µm, the coating diameter is allowed a variation of 2 µm).

Additionally, even in a case where the drawing speed has fluctuated due to a disturbance, there is no divergence from the feedback control, and the adjustment of the cooling capacity within the cooling device is stably performed. As a result of the stable cooling, a fluctuation in the temperature of the bare optical fiber at the outlet of the cooling device becomes small. As a result, the fluctuation in the coating diameter can be suppressed to ±1 µm or less.

Example 1

In the configuration of the apparatus shown in FIG. 1, an optical fiber is drawn at a center drawing speed of 1500 in/min, and the optical fiber is manufactured.

The cooling device which are not connected to the heating furnace and the coating device are connected together by the connecting member. Piping is arranged such that helium gas is made to flow into the lower portion of the cooling device, and piping is arranged such that carbon dioxide gas is made to flow into the upper portion of a coating device. The length of the connecting member is 300 mm. As the cooling device, five cylinders made of brass in which the internal diameter φ is 10 mm, the shape of the inner wall is flat, and the length is 1 m are connected together and used, and the cooling length of the cooling device is 5 m. Additionally, the temperature of the cooling water which circulates through the inside of a circulating water cylinder is 20° C.

Feedback control of the flow rate of the carbon dioxide gas is performed by a coating diameter signal. The total flow rate of the gas within the cooling device is 5 SLM, the flow rate of the helium gas is 4 SLM, and the flow rate of the carbon dioxide gas is 1 SLM.

Figure 5:
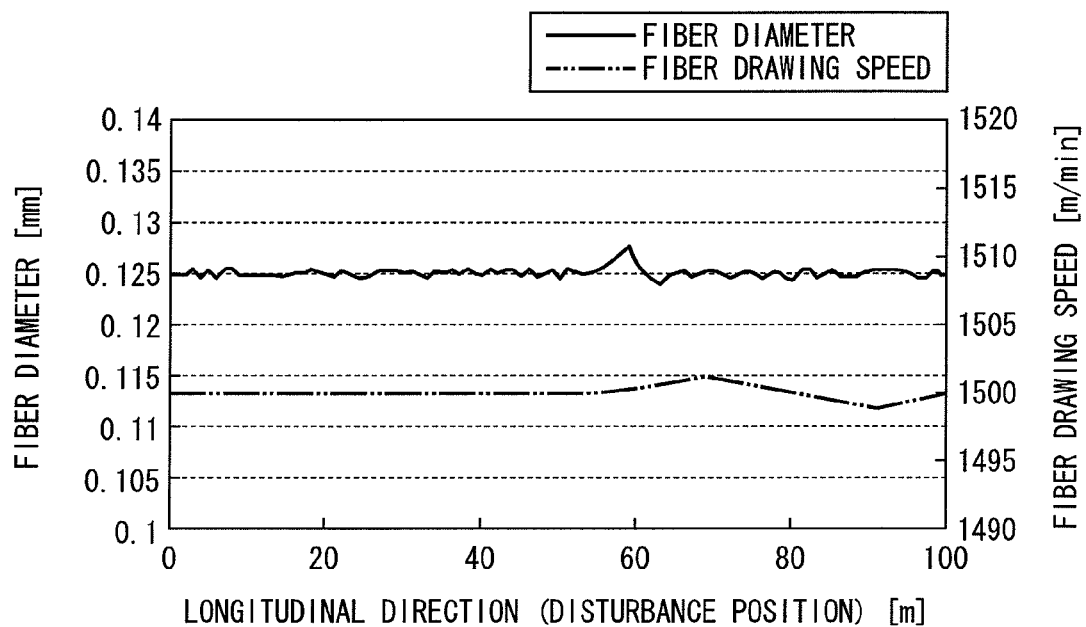
FIG. 5 is a view showing a fiber diameter fluctuation and a drawing speed fluctuation in Example 1.
Figure 6:
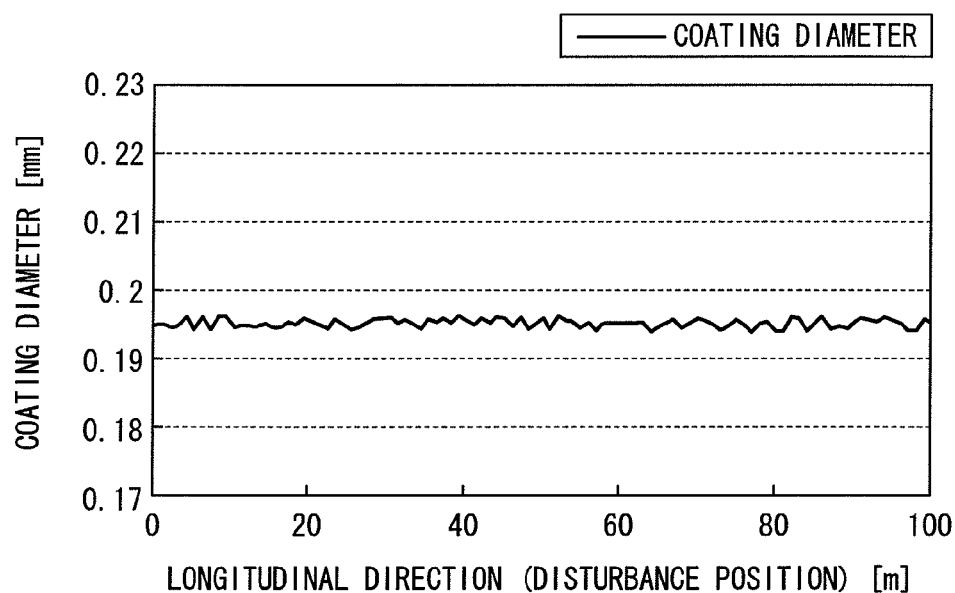
FIG. 6 is a view showing a coating diameter fluctuation in Example 1.

The temperature of the bare optical fiber and the temperature of the mixed gas are measured. The temperature of the bare optical fiber introduced into the cooling device is 1100° C., the temperature of the cooling gas (the mixed gas of the helium gas and the carbon dioxide gas) introduced into the cooling device is 25° C., and the temperature of the mixed gas discharged from the upper end of the cooling device is 68° C. In this state, drawing of an optical fiber of a total of 10,000 km is implemented. As a result, the responsiveness of the cooling capacity of the cooling device and the resistance against a disturbance are excellent, and the coating diameter of the manufactured optical fiber is uniform, which is excellent. Examples of a fiber diameter fluctuation and drawing speed fluctuation, and coating diameter fluctuation of the bare optical fiber in this Example 1 are shown in FIGS. 5 and 6, respectively.

Example 2

An optical fiber is manufactured similarly to Example 1 except that the internal diameter φ of the cooling device is 7 mm, the total flow rate of the gas within the cooling device is 2 SLM, the flow rate of the helium gas is 1.5 SLM, and the flow rate of the carbon dioxide gas is 0.5 SLM.

Figure 7:
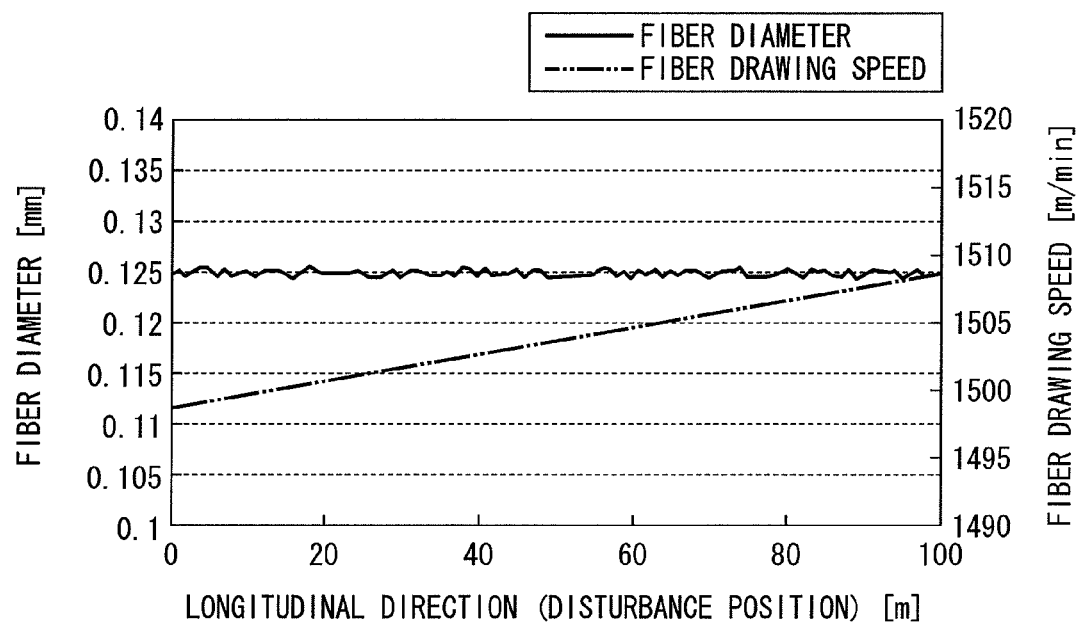
FIG. 7 is a view showing a fiber diameter fluctuation and a drawing speed fluctuation in Example 2.
Figure 8:
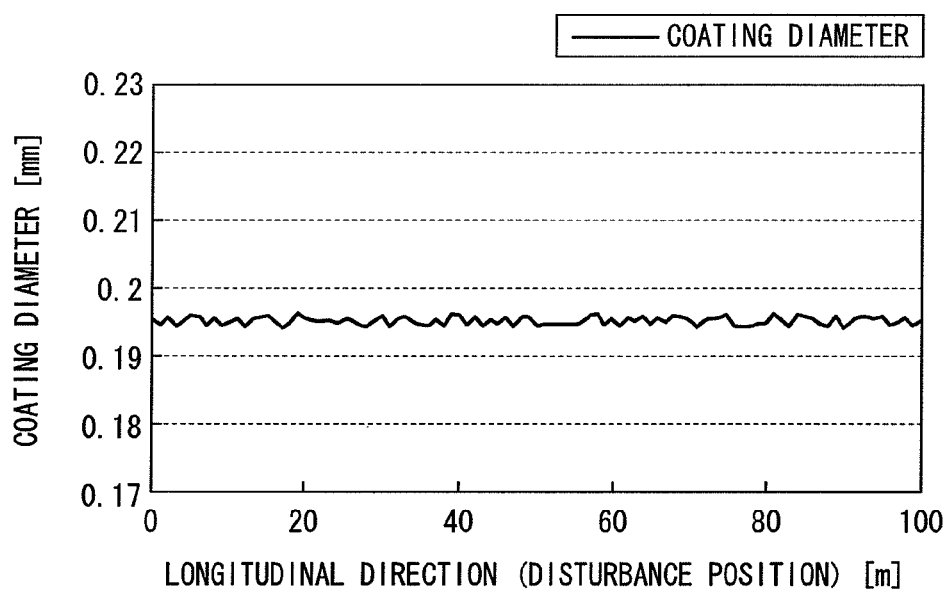
FIG. 8 is a view showing a coating diameter fluctuation in Example 2.

The temperature of the bare optical fiber and the temperature of the mixed gas are measured. The temperature of the bare optical fiber introduced into the cooling device is 1100° C., the temperature of the cooling gas (the mixed gas of the helium gas and the carbon dioxide gas) introduced into the cooling device is 25° C., and the temperature of the mixed gas discharged from the upper end of the cooling device is 99° C. In this state, drawing of an optical fiber of a total of 10,000 km is implemented. As a result, the responsiveness of the cooling capacity of the cooling device and the resistance against a disturbance are excellent, and the coating diameter of the manufactured optical fiber is uniform, which is excellent. An example of a drawing speed fluctuation and a coating diameter fluctuation in this Example 2 is shown in FIGS. 7 and 8, respectively.

Example 3

An optical fiber is manufactured similarly to Example 1 except that the internal diameter φ of the cooling device is 15 mm, the shape of the inner wall of the cooling device is formed into a concavo-convex shape (refer to FIG. 4), the total flow rate of the gas within the cooling device is 10 SLM, the flow rate of the helium gas is 8 SLM, and the flow rate of the carbon dioxide gas is 2 SLM. In this example, the inner wall 14*a* of the cooling device is formed with the convex portions 14*f*, and thereby a concavo-convex shape is formed within the cooling device to increase the surface area within the cooling device. Therefore, the heat exchange between the inner wall of the cooling device and the gas within the cooling device becomes better.

Figure 9:
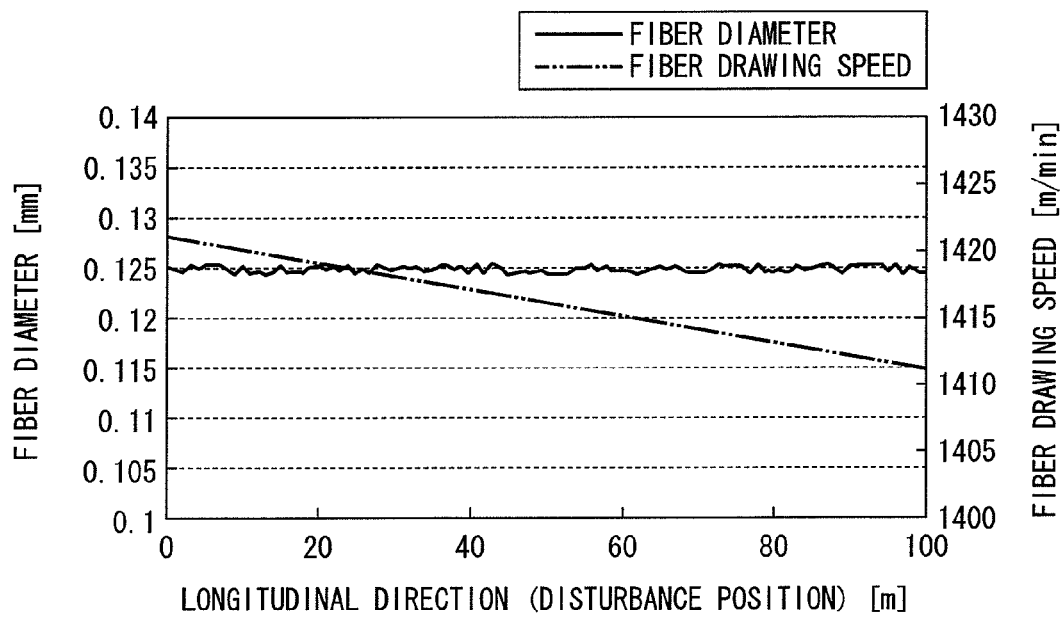
FIG. 9 is a view showing a fiber diameter fluctuation and a drawing speed fluctuation in Example 3.
Figure 10:
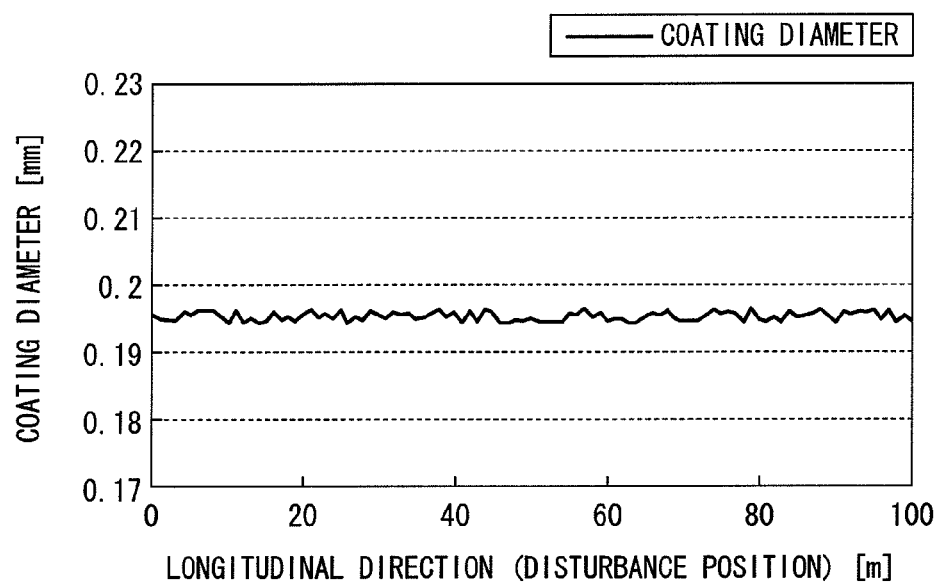
FIG. 10 is a view showing a coating diameter fluctuation in Example 3.

The temperature of the bare optical fiber and the temperature of the mixed gas are measured. The temperature of the bare optical fiber introduced into the cooling device is 1100° C., the temperature of the cooling gas (the mixed gas of the helium gas and the carbon dioxide gas) introduced into the cooling device is 25° C., and the temperature of the mixed gas discharged from the upper end of the cooling device is 52° C. In this state, drawing of an optical fiber of a total of 10,000 km is implemented. As a result, the responsiveness of the cooling capacity and the resistance against a disturbance are excellent, and the coating diameter of the manufactured optical fiber is uniform, which is excellent. An example of a drawing speed fluctuation and a coating diameter fluctuation in this example 3 is shown in FIGS. 9 and 10, respectively.

Comparative Example 1

Example in which, Since Flow Rate of Gas is Small (Flow Velocity is Slow), Heat Exchange Between the Bare Optical Fiber and Gas Becomes Insufficient, and the Bare Optical Fiber Cannot be Cooled An optical fiber is manufactured similarly to Example 2 except that the total flow rate of the gas within the cooling device is 1 SLM, the flow rate of the helium gas is 0.75 SLM, and the flow rate of the carbon dioxide gas is 0.25 SLM.

Although fiber drawing is started, the bare optical fiber could not be cooled and the fiber drawing could not be performed, before the drawing speed reached a normal drawing speed of 1500 m/min.

Comparative Example 2

Example in which the Temperature of Discharged Gas is High and the Responsiveness of the Cooling Device Became Too Insensitive An optical fiber is manufactured similarly to Comparative Example 1 except that as the cooling device, seven cylinders made of brass in which the internal diameter φ is 7 mm, the shape of the inner wall is flat, and the length is 1 m are connected together are used, and the cooling length of the cooling device is 7 m.

Figure 11:
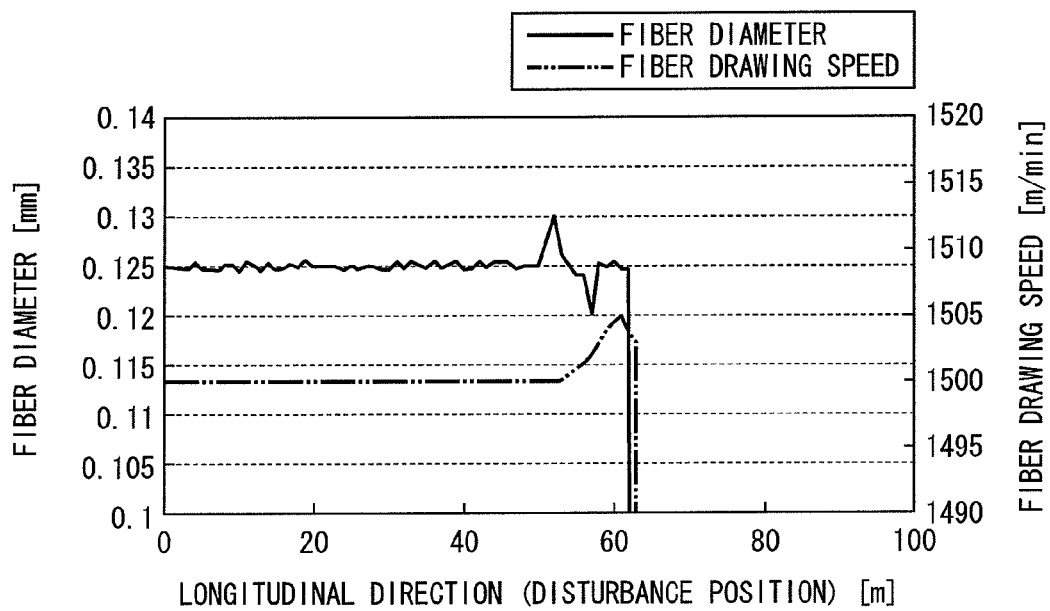
FIG. 11 is a view showing a fiber diameter fluctuation and a drawing speed fluctuation in Comparative Example 2.
Figure 12:
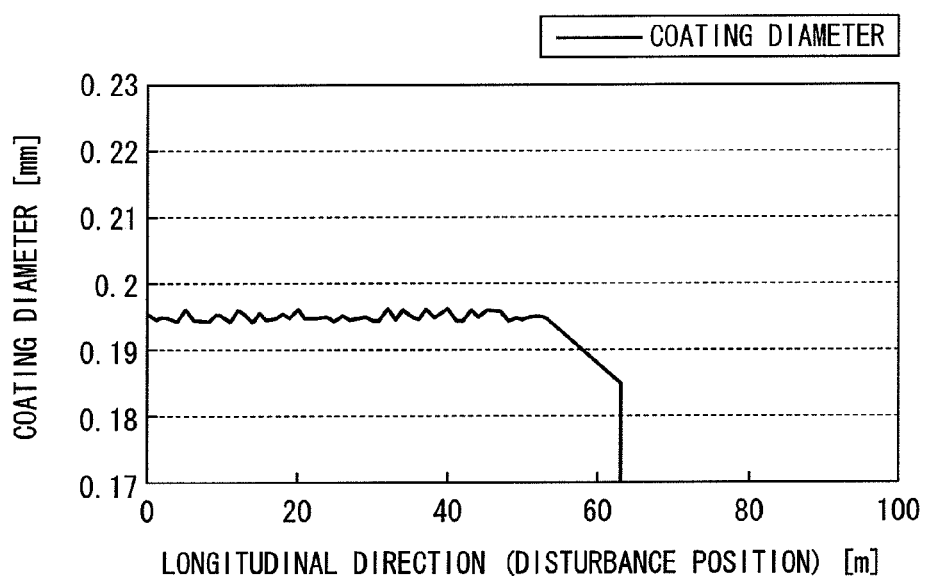
FIG. 12 is a view showing a coating diameter fluctuation in Comparative Example 2.

Fiber drawing is started and a drawing speed of 1500 m/min could be obtained. The temperature of the bare optical fiber and the temperature of the mixed gas are measured. The temperature of the bare optical fiber introduced into the cooling device is 1100° C., the temperature of the cooling gas (the mixed gas of the helium gas and the carbon dioxide gas) introduced into the cooling device is 25° C., and the temperature of the mixed gas discharged from the upper end of the cooling device is 134° C. In this state, drawing of an optical fiber of a total of 10,000 km is implemented. As a result, when instantaneous fiber diameter fluctuations had occurred about 3 times, the responsiveness of the cooling capacity of the cooling device did not fulfill demand, and the coating diameter became small. As a result, the coating became impossible, and the optical fiber broke. An example of a drawing speed fluctuation and a coating diameter fluctuation in this Comparative Example 2 is shown in FIGS. 11 and 12, respectively.

Comparative Example 3

Example in which the Discharged Gas Temperature is Low and the Responsiveness is Too Sensitive An optical fiber is manufactured similarly to Example 3 except that the internal diameter φ of the cooling device is 20 mm, the total flow rate of the gas within the cooling device is 20 SLM, the flow rate of the helium gas is 16 SLM, and the flow rate of the carbon dioxide gas is 4 SLM.

Figure 13:
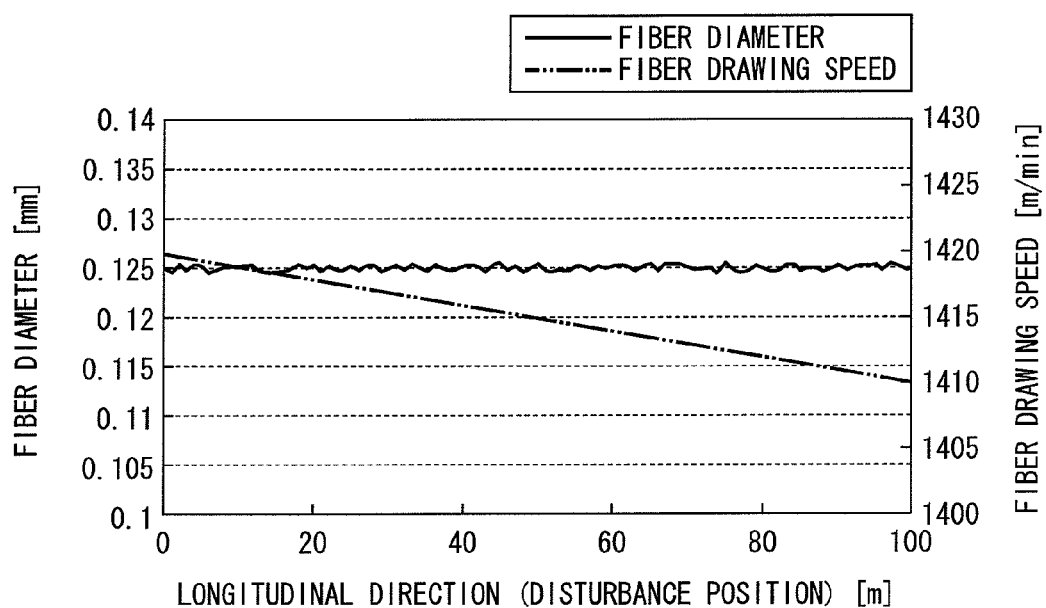
FIG. 13 is a view showing a fiber diameter fluctuation and a drawing speed fluctuation in Comparative Example 3.
Figure 14:
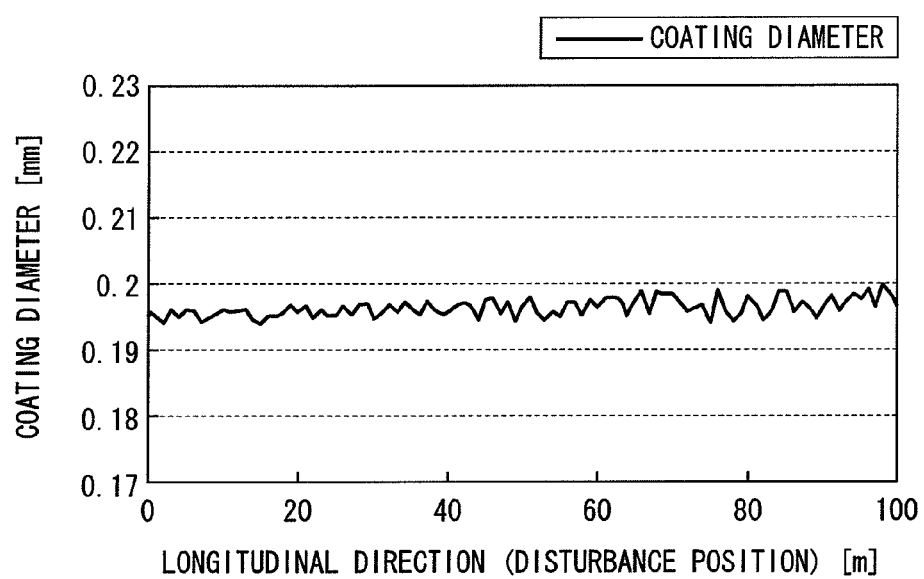
FIG. 14 is a view showing a coating diameter fluctuation in Comparative Example 3.
Figure 15:
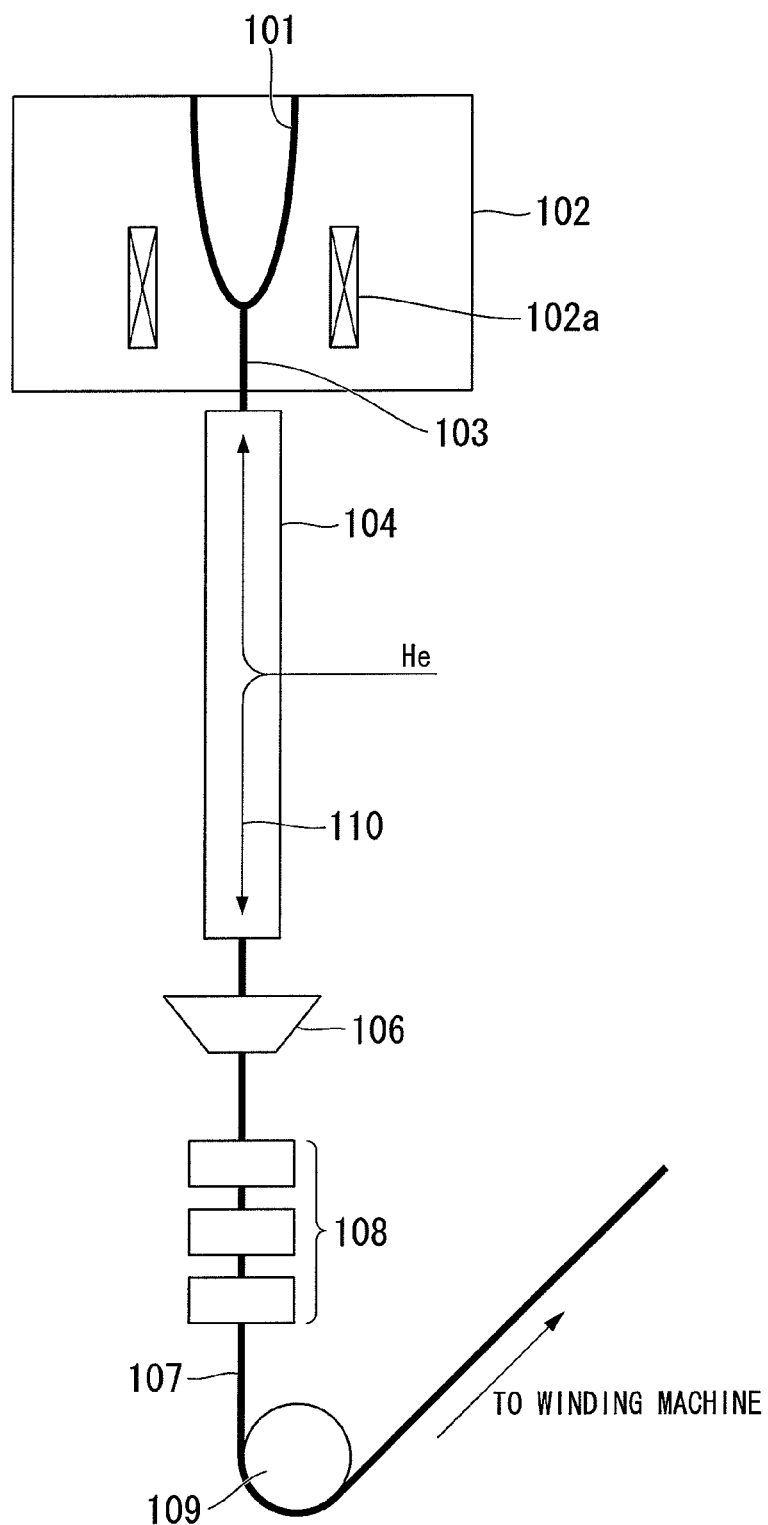
FIG. 15 is a schematic configuration view showing an apparatus for manufacturing an optical fiber which is used for a conventional method for manufacturing an optical fiber.
Figure 16:
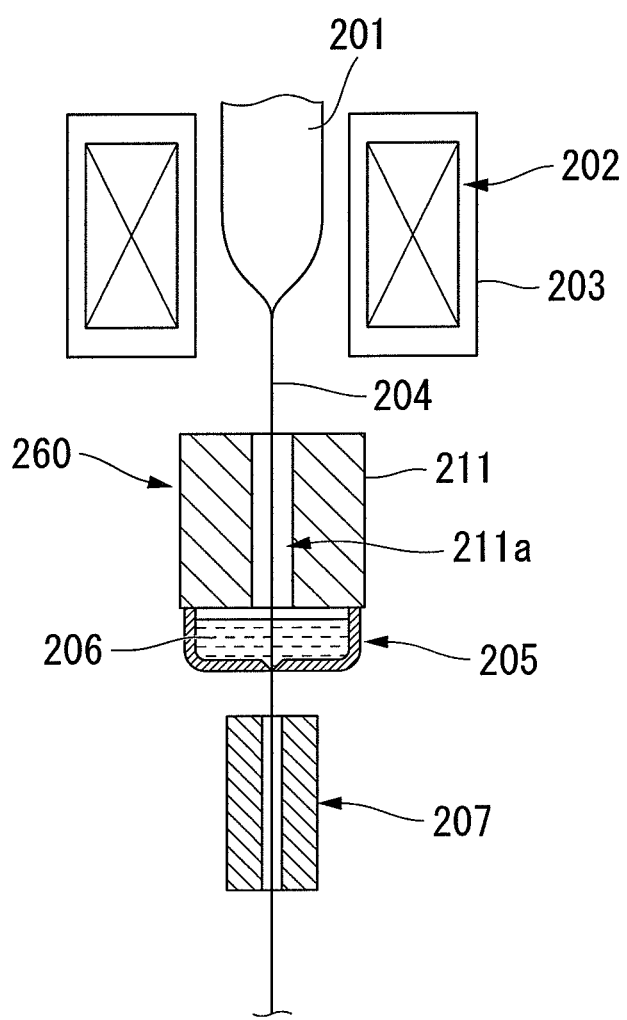
FIG. 16 is a schematic configuration view showing an apparatus for manufacturing an optical fiber which is used for another conventional method for manufacturing an optical fiber.

The temperature of the bare optical fiber and the temperature of the mixed gas are measured. The temperature of the bare optical fiber introduced into the cooling device is 1100° C., the temperature of the cooling gas (the mixed gas of the helium gas and the carbon dioxide gas) introduced into the cooling device is 25° C., and the temperature of the mixed gas discharged from the upper end of the cooling device is 44° C. In this state, drawing of an optical fiber of a total of 10,000 km is implemented. As a result, the responsiveness of the cooling capacity of the cooling device became sensitive in some cases, and a place where the coating diameter fluctuates minutely at a low drawing speed by a drawing speed fluctuation is present. Although the resistance against a disturbance is excellent and fiber drawing could be performed, the coating diameter of the manufactured optical fiber, which is not an excellent article, fluctuated. An example of a drawing speed fluctuation and a coating diameter fluctuation is shown in FIGS. 13 and 14. As shown in FIG. 14, as the drawing speed became lower, the fluctuation width increased.

Example 4

Example in which Drawing Speed is 2000 m/min

An optical fiber is manufactured similarly to Example 1 except that fiber-drawing is performed at a center drawing speed of 2000 m/min; as the cooling device, seven cylinders made of brass in which the internal diameter φ is 10 mm, the shape of the inner wall is flat, and the length is 1 m are connected together are used, and the cooling length of the cooling device is 7 m; and the total flow rate of the gas within the cooling device is 4 SLM, the flow rate of the helium gas is 3.5 SLM, and the flow rate of the carbon dioxide gas is 0.5 SLM.

The temperature of the bare optical fiber and the temperature of the mixed gas are measured. The temperature of the bare optical fiber introduced into the cooling device is 1200° C., the temperature of the cooling gas (the mixed gas of the helium gas and the carbon dioxide gas) introduced into the cooling device is 25° C., and the temperature of the mixed gas discharged from the upper end of the cooling device is 86° C. In this state, drawing of an optical fiber of a total of 10,000 km is implemented. As a result, the responsiveness of the cooling capacity of the cooling device and the resistance against a disturbance are excellent, and the coating diameter of the manufactured optical fiber is uniform, which is excellent.

Example 5

Example in which Drawing Speed is 2500 m/min

An optical fiber is manufactured similarly to Example 1 except that fiber-drawing is performed at a center drawing speed of 2500 m/min; as the cooling device, eight cylinders made of brass in which the internal diameter $\phi$ is 15 mm, the shape of the inner wall is concavo and convex (irregular), and the length is 1 m are connected together are used, the cooling length of the cooling device is 8 m; the total flow rate of the gas within the cooling device is 3 SLM, the flow rate of the helium gas is 2.6 SLM, and the flow rate of the carbon dioxide gas is 0.4 SLM.

The temperature of the bare optical fiber and the temperature of the mixed gas are measured. The temperature of the bare optical fiber introduced into the cooling device is 1200° C., the temperature of the cooling gas (the mixed gas of the helium gas and the carbon dioxide gas) introduced into the cooling device is 25° C., and the temperature of the mixed gas discharged from the upper end of the cooling device is 76° C. In this state, drawing of an optical fiber of a total of 10,000 km is implemented. As a result, the responsiveness of the cooling capacity and the resistance against a disturbance are excellent, and the coating diameter of the manufactured optical fiber is uniform, which is excellent.

Example 6

Example in which Drawing Speed is 1000 m/min

An optical fiber is manufactured similarly to Example 1 except that fiber-drawing is performed at a center drawing speed of 1000 m/min; and, as the cooling device, three and half cylinders made of brass in which the internal diameter $\phi$ is 10 mm, the shape of the inner wall is flat, and the length is 1 m are connected together are used, and the cooling length of the cooling device is 3.5 m.

The temperature of the bare optical fiber and the temperature of the mixed gas are measured. The temperature of the bare optical fiber introduced into the cooling device is 1000° C., the temperature of the cooling gas (the mixed gas of the helium gas and the carbon dioxide gas) introduced into the cooling device is 25° C., and the temperature of the mixed gas discharged from the upper end of the cooling device is 57° C. In this state, drawing of an optical fiber of a total of 10,000 km is implemented. As a result, the responsiveness of the cooling capacity and the resistance against a disturbance are excellent, and the coating diameter of the manufactured optical fiber is uniform, which is excellent.

The results of the above Examples 1 to 6 and Comparative Examples 1 to 3 are summarized in Table 1. The results will be discussed.

TABLE 1

| Examples | Fiber drawing speed (m/min) | Internal diameter of cooling device ($\phi$ mm) | Shape of inner wall of cooling device | Length of cooling device (m) | Temperature of fiber introduced into cooling device (° C.) | Total amount of gas introduced into cooling device (SLM) | Temperature of gas introduced into cooling device (° C.) | Temperature of introduction port × 2 (° C.) | Temperature of gas at upper portion of cooling device (° C.) | Temperature of introduction port × 4 (° C.) | Responsiveness of cooling capacity | Capable of being cooled | Disturbance resistance |
|---|---|---|---|---|---|---|---|---|---|---|---|---|---|
| Example 1 | 1500 | 10 | Flat | 5 | 1100 | 5 | 25 | 50 | 68 | 100 | Excellent | Yes | Strong |
| Example 2 | 1500 | 7 | Flat | 5 | 1100 | 2 | 25 | 50 | 99 | 100 | Excellent | Yes | Strong |
| Example 3 | 1500 | 15 | Concavo-convex | 5 | 1100 | 10 | 25 | 50 | 52 | 100 | Excellent | Yes | Strong |
| Comparative Example 1 | 1500 | 7 | Flat | 5 | 1100 | 1 | 25 | 50 | — | 100 | — | No | — |
| Comparative Example 2 | 1500 | 7 | Flat | 7 | 1100 | 1 | 25 | 50 | 134 | 100 | Excellent | Yes | Weak |
| Comparative Example 3 | 1500 | 20 | Concavo-convex | 5 | 1100 | 20 | 25 | 50 | 44 | 100 | Oversensitive | Yes | Strong |
| Example 4 | 2000 | 10 | Flat | 7 | 1200 | 4 | 25 | 50 | 86 | 100 | Excellent | Yes | Strong |
| Example 5 | 2500 | 15 | Concavo-convex | 8 | 1200 | 3 | 25 | 50 | 76 | 100 | Excellent | Yes | Strong |
| Example 6 | 1000 | 10 | Flat | 3.5 | 1000 | 5 | 25 | 50 | 57 | 100 | Excellent | Yes | Strong |

In Examples 1 to 3 and Comparative Examples 1 to 3, all manufacturing drawing speeds (fiber drawing speeds) are 1500 m/min. In the respective examples, the responsiveness of the cooling capacity and the resistance against a disturbance are confirmed by changing the internal diameter of the cooling device, the shape of the inner wall of the cooling device, the length of the cooling device, and the flow rate of a gas to be introduced into the cooling device.

The respective examples will be described.

If the internal diameter of the cooling device becomes small, the surface area of the inner wall decreases. Therefore, heat exchange is difficult to perform between the cooling gas within the cooling device and the inner wall of the cooling device. In the above Examples 1 to 3 and Comparative Examples 1 to 3, a change in flow velocity is slight because the flow rate of a cooling gas to be introduced into the cooling device is also reduced according to the internal diameter. Therefore, as compared to Example 1, in Example 2 and Comparative Example 2, it is difficult to transfer heat to the cooling device from the cooling gas, the heat of the cooling gas is maintained, and the gas temperature of the upper end of the cooling cylinder rises. The responsiveness of the cooling capacity of the cooling device and the resistance against a disturbance are excellent until this temperature reaches 100° C. (99° C. in Example 2). However, if the temperature of the gas at the upper end of the cooling cylinder exceeds 100° C. (134° C. in Comparative Example 2), this is not desirable because a long cooling length is also required and the resistance against a disturbance also deteriorates.

In Comparative Example 2, the resistance against a disturbance deteriorates. In this Comparative Example 2, as shown in FIG. 11, a fluctuation occurs in fiber drawing speed due to a disturbance such as a fiber diameter fluctuation, and the fiber drawing speed is abruptly increasing. Also, as shown in FIG. 12, it is not possible to respond to this increase in drawing speed, and the coating diameter becomes abruptly small in a certain place. This is caused by the fact that the cooling capacity of the cooling device has abruptly declined because the temperature difference between the surface temperature of the bare optical fiber at the upper portion of the cooling device and the cooling gas in the vicinity of the bare optical fiber is reduced when the coating diameter becomes abruptly small, as well as the responsiveness of the cooling capacity of the cooling device being bad. In this regard, in Example 2, the responsiveness of the cooling capacity to a disturbance (here, an abrupt increase in the drawing speed) is excellent, and the cooling capacity can be maintained because a difference in temperature between the surface temperature of the bare optical fiber and the cooling gas in the vicinity of the bare optical fiber can be sufficiently secured at the upper portion of the cooling device.

Additionally, in Example 3 and Comparative Example 3, the shape of the inner wall of the cooling device is formed into concavity and convexity (irregularity) from flatness, whereby the surface area of this inner wall is increased, and heat exchange is easily performed between the cooling gas and the inner wall. As a result, although the temperature of the cooling gas of the upper portion of the cooling device decreases, if this temperature is equal to or higher than 50° C. (52° C. in Example 3), both the responsiveness and the disturbance resistance are excellent (FIGS. 9 and 10). However, although this temperature is no problem at 44° C. (Comparative Example 3) at the center drawing speed, the coating diameter minutely fluctuates at a low drawing speed by a drawing speed fluctuation (FIGS. 13 and 14). In Comparative Example 3, the responsiveness of the cooling capacity became more sensitive at the low drawing speed compared with at the center drawing speed, and the feedback control by PID setting values matched with the center drawing speed became inappropriate at the low drawing speed. As a result, it is considered that hunting occurred. In Example 3, since the temperature of the discharged gas can be maintained within the range of $[t_{gas} \times 2(° C.)] \leq T_{gas}(° C.) \leq [t_{gas} \times 4(° C.)]$, excellent responsiveness of the cooling capacity can be secured at the low drawing speed.

From the above, the gas temperature of the upper portion of the cooling device is 25° C.×2=50° C. or higher, and both the responsiveness and the disturbance resistance can be excellent until 25° C.×4=100° C.

Since the flow rate ratio of the helium gas and carbon dioxide gas within the cooling device in Comparative Example 1 is the same as Example 2, it is considered that the helium concentration within the cooling device is almost the same even in arbitrary places (since it is considered that the degree that the gas which flows along with the bare optical fiber at the upper portion of the cooling device is mixed into the cooling device changes somewhat, this is expressed as "almost"). However, in Comparative Example 1, the flow rate of the cooling gas is small. Therefore, the flow velocity of the cooling gas is slow, and the heat exchange between the surface of the bare optical fiber and the cooling gas and the heat exchange between the cooling gas and the inner wall of the cooling device are hard to perform. As a result, in Comparative Example 1, it can be said that the cooling capacity declined and the cooling capacity could not be maintained at a fiber drawing speed of 1500 m/min.

In Examples 1 to 3, it can be seen that there is no change in the coating diameter even against disturbances, such as a fiber diameter fluctuation, an increase in the drawing speed, and a decrease in the drawing speed (refer to FIGS. 5 to 10). This is because appropriate responsiveness of the cooling capacity can be maintained in Examples 1 to 3.

Next, Examples 4 to 6 will be described.

In Examples 4 to 6, fiber drawing is implemented by determining conditions such that the fiber drawing speed and the cooling length are changed and the temperature of the upper portion of the cooling device fell within a specified range. As a result, even at arbitrary fiber drawing speeds, the resistance against a disturbance could be maintained. This shows that, since the temperature (temperature of the cooling gas discharged from the cooling device) of the cooling gas of the upper portion of the cooling device is appropriately maintained, a difference in temperature between the temperature of the surface of the bare optical fiber and the cooling gas at the upper portion of the cooling device can be appropriately secured, and since the responsiveness of cooling capacity is not too sensitive and falls within an appropriate range even at a low drawing speed, the cooling capacity can be appropriately adjusted by PID setting values at the center drawing speed. From the above, it can be said that excellent fiber drawing can be performed at a fiber drawing speed of 1000 m/min to 2500 m/min.

According to the method for manufacturing an optical fiber of the invention, the concentration of the helium gas within the cooling device is increased. Additionally, since the transfer of the heat from the bare optical fiber to the cooling gas can be made to be slow in the upper portion of the cooling device, the responsiveness of adjustment of the cooling capacity can be appropriately performed. In addition, since the cooling capacity can be adjusted to a stable range for manufacture, the bare optical fiber can be introduced into the coating device in a state where the temperature of the bare optical fiber forcibly cooled within the cooling device is uniform, the influence of the above disturbances is suppressed, and the diameter of the protective covering layer formed on the bare optical fiber can be made uniform.

What is claimed is:

1. A method for manufacturing an optical fiber, comprising:

melting and deforming an optical fiber preform in a heating furnace;

drawing out a melted and deformed part of the optical fiber preform as a bare optical fiber;

forcibly cooling the bare optical fiber using a cooling device;

forming a protective covering layer on the bare optical fiber, which has been forcibly cooled, using a coating device; and curing the protective covering layer using a curing device, wherein a flow of a cooling gas within the cooling device is made to be an upward flow and the cooling gas is discharged to outside from an upper end of the cooling device, by connecting the cooling device and the coating device in an airtight manner, and closing a flow of the cooling gas which flows toward the coating device side within the cooling device using a meniscus of resin within the coating device, and a temperature of the cooling gas is increased toward an upper portion of the cooling device from a lower portion of the cooling device by adjusting a flow rate of the cooling gas.

2. The method for manufacturing an optical fiber according to claim 1, wherein helium gas and carbon dioxide gas are used as the cooling gas;

the helium gas is introduced from any position between a lower portion of the cooling device and the meniscus of the resin within the coating device; and the carbon dioxide gas is introduced from any position between the lower portion of the cooling device and the meniscus of the resin within the coating device, and below a place where the helium gas is introduced.

3. The method for manufacturing an optical fiber according to claim 1, wherein the cooling device and the coating device are connected using a connecting member.

4. The method for manufacturing an optical fiber according to claim 1, wherein a flow rate of the helium gas and a flow rate of the carbon dioxide gas are adjusted based on a temperature of a mixed gas of the helium gas and the carbon dioxide gas at the upper end of the cooling device, and a temperature of the mixed gas at an introduction port through which the helium gas is introduced.

5. The method for manufacturing an optical fiber according to claim 1, wherein a following relational expression is satisfied when the temperature of the mixed gas at the upper end of the cooling device is defined as Tgas and the temperature of the mixed gas at the introduction port is defined as tgas $$[tgas \times 2(C.°)] \leq Tgas(C.°) \leq [tgas \times 4(C.°)].$$

6. The method for manufacturing an optical fiber according to claim 1, wherein a space filled with the carbon dioxide gas is formed on a lower portion side which is lower than a position where the helium gas is introduced.

7. The method for manufacturing an optical fiber according to claim 2, wherein a partition is provided between a position where the helium gas is introduced and a position where the carbon dioxide gas is introduced, and the bare optical fiber passes through a hole with a diameter of 1 to 5 mm provided at a central portion of the partition.

8. The method for manufacturing an optical fiber according to claim 3, wherein the helium gas is introduced from the lower portion of the cooling device; and the carbon dioxide gas is introduced from the connecting member.

9. The method for manufacturing an optical fiber according to claim 3, wherein the helium gas is introduced from the connecting member; and the carbon dioxide gas is introduced from the coating device.

10. The method for manufacturing an optical fiber according to claim 9, wherein the carbon dioxide gas is introduced from an upper portion of the coating device.

11. The method for manufacturing an optical fiber according to claim 1, wherein helium gas and carbon dioxide gas are used as the cooling gas; and after the helium gas and the carbon dioxide gas are mixed, the mixed gas is introduced from any position between a lower portion of the cooling device and an upper portion of the coating device.

12. The method for manufacturing an optical fiber according to claim 1, wherein a surface area of an inner wall of the cooling device is determined in advance.

13. An optical fiber manufactured by the method according to any one of claims 1 to 12.

* * * * *